(12) United States Patent
Bishop et al.

(10) Patent No.: US 11,171,903 B2
(45) Date of Patent: Nov. 9, 2021

(54) TECHNIQUES FOR INTELLIGENT MESSAGING FOR MESSAGE SYNCING

(71) Applicant: Facebook, Inc., Menlo Park, CA (US)

(72) Inventors: Olivia Hsu Bishop, San Francisco, CA (US); Thomas Apostolos Georgiou, Reston, VA (US); Jeremy David Fein, New York, NY (US); Eyal Guthmann, San Francisco, CA (US); Jason Curtis Jenks, Lynnwood, WA (US)

(73) Assignee: FACEBOOK, INC., Menlo Park, CA (US)

( * ) Notice: Subject to any disclaimer, the term of this patent is extended or adjusted under 35 U.S.C. 154(b) by 746 days.

(21) Appl. No.: 14/621,875

(22) Filed: Feb. 13, 2015

(65) Prior Publication Data

US 2016/0043983 A1 Feb. 11, 2016

Related U.S. Application Data

(60) Provisional application No. 62/035,663, filed on Aug. 11, 2014, provisional application No. 62/035,665, (Continued)

(51) Int. Cl.
*H04L 12/58* (2006.01)

(52) U.S. Cl.
CPC .............. *H04L 51/16* (2013.01); *H04L 51/22* (2013.01); *H04L 51/24* (2013.01)

(58) Field of Classification Search
CPC .......... H04L 51/16; H04L 51/22; H04L 51/24
(Continued)

(56) References Cited

U.S. PATENT DOCUMENTS 5,930,337 A 7/1999 Mohler
8,180,902 B1 5/2012 Day et al.
(Continued)

OTHER PUBLICATIONS

Office Action received for U.S. Appl. No. 14/621,851, dated Jun. 2, 2017, 19 pages.
(Continued)

*Primary Examiner* — Umar Cheema
*Assistant Examiner* — Tony Williams
(74) *Attorney, Agent, or Firm* — Kacvinsky Daisak Bluni PLLC

(57) ABSTRACT

Techniques for intelligent messaging for message syncing are described. An apparatus may comprise a recipient inbound messaging component, a recipient queue management component, a recipient update customization component, and a recipient outbound messaging component. The recipient inbound messaging component may be operative to receive an incoming update at a recipient update queue, the recipient update queue associated with a recipient of the incoming update. The recipient queue management component may be operative to add the incoming update to the recipient update queue and determine a recipient messaging endpoint to receive the incoming update. The recipient update customization component may be operative to retrieve one or more recipient messaging endpoint parameters associated with the recipient messaging endpoint and generate a customized incoming update from the incoming update according to the one or more recipient messaging endpoint parameters. The recipient outbound messaging component may be operative to transmit the customized incoming update to the recipient messaging endpoint. Other embodiments are described and claimed.

20 Claims, 18 Drawing Sheets

Related U.S. Application Data filed on Aug. 11, 2014, provisional application No. 62/035,668, filed on Aug. 11, 2014, provisional application No. 62/035,673, filed on Aug. 11, 2014.

(58) Field of Classification Search
USPC .......................................................... 709/206
See application file for complete search history.

(56) References Cited

U.S. PATENT DOCUMENTS

| | | | |
|---|---|---|---|
| 8,739,249 B1 | 5/2014 | Kay et al. | |
| 8,818,957 B2 | 8/2014 | Sosnosky et al. | |
| 9,306,887 B1 | 4/2016 | Brunetti et al. | |
| 10,009,307 B2 | 6/2018 | Li et al. | |
| 2002/0049815 A1 | 4/2002 | Dattatri | |
| 2003/0096600 A1* | 5/2003 | Lewis | H04L 29/06 |
| | | | 455/412.1 |
| 2004/0177323 A1* | 9/2004 | Kaasila | G06F 3/0481 |
| | | | 715/201 |
| 2004/0237044 A1* | 11/2004 | Travieso | G06F 17/289 |
| | | | 715/202 |
| 2005/0193010 A1* | 9/2005 | DeShan | G06Q 30/02 |
| 2006/0064527 A1 | 3/2006 | Fisher et al. | |
| 2007/0067373 A1* | 3/2007 | Higgins | G06F 11/3013 |
| 2007/0073813 A1 | 3/2007 | Kamat et al. | |
| 2007/0288931 A1* | 12/2007 | Avkarogullari | G06F 9/544 |
| | | | 719/312 |
| 2008/0082604 A1 | 4/2008 | Mansour et al. | |
| 2008/0270547 A1 | 10/2008 | Glickstien et al. | |
| 2008/0270629 A1 | 10/2008 | Yang et al. | |
| 2008/0276279 A1* | 11/2008 | Gossweiler | H04N 21/235 |
| | | | 725/46 |
| 2008/0313297 A1* | 12/2008 | Heron | H04L 12/581 |
| | | | 709/207 |
| 2010/0030818 A1 | 2/2010 | Cooper et al. | |
| 2010/0071053 A1* | 3/2010 | Ansari | G06Q 30/04 |
| | | | 726/12 |
| 2011/0080940 A1* | 4/2011 | Bocharov | H04N 21/4331 |
| | | | 375/240.01 |
| 2011/0176418 A1 | 7/2011 | Gershinsky et al. | |
| 2011/0196955 A1 | 8/2011 | Odaka et al. | |
| 2012/0143957 A1 | 6/2012 | Ganapathy et al. | |
| 2012/0179767 A1* | 7/2012 | Clarke | H04L 51/34 |
| | | | 709/206 |
| 2012/0198004 A1* | 8/2012 | Watte | H04L 51/043 |
| | | | 709/206 |
| 2012/0231770 A1* | 9/2012 | Clarke | H04L 51/34 |
| | | | 455/414.1 |
| 2013/0067015 A1 | 3/2013 | Vasters | |
| 2013/0273938 A1 | 10/2013 | Ng et al. | |
| 2014/0074783 A1 | 3/2014 | Alsina et al. | |
| 2014/0201324 A1* | 7/2014 | Zhang | H04L 65/4084 |
| | | | 709/217 |
| 2014/0310365 A1 | 10/2014 | Sample et al. | |
| 2015/0012603 A1 | 1/2015 | Saito | |
| 2015/0373069 A1 | 12/2015 | Rajapakse | |
| 2016/0057042 A1 | 2/2016 | Bengochea et al. | |

OTHER PUBLICATIONS

Office Action received for U.S. Appl. No. 14/621,865, dated Jun. 6, 2017, 19 pages.

Office Action received for U.S. Appl. No. 14/621,846, dated Jun. 29, 2017, 16 pages.

"Cache". Webopedia. 2012. https://www.webopedia.com/TERM/C/cache.html (Year: 2008).

"Cache Computing", Wikipedia, https://en.wikipedia.org/wiki/Cache_(computing), dated Jul. 27, 2018.

"Database", Wikipedia, https://.en.wikipedia.org/wiki/Database, dated Jul. 27, 2018.

* cited by examiner

1000

- Receive an incoming update at a recipient update queue, the recipient update queue associated with a recipient of the incoming update.
  *1002*

- Determine an incoming recipient sequence number for the recipient update queue, the incoming recipient sequence number determined by incrementing a highest current recipient sequence number for the recipient update queue.
  *1004*

- Assign the incoming recipient sequence number to the incoming update
  *1006*

- Add the incoming update to the recipient update queue.
  *1008*

- Determine a current recipient sequence number for a current recipient update state of a recipient messaging endpoint associated with the recipient of the incoming update.
  *1010*

- Determine that the incoming recipient sequence number is greater than the current recipient sequence number for the current recipient update state of the recipient messaging endpoint.
  *1012*

- Transmit the incoming update to the recipient messaging endpoint based on the determination that the incoming recipient sequence number is greater than the current recipient sequence number.
  *1014*

- Update the current recipient sequence number for the current recipient update state of the recipient messaging endpoint to be at least the incoming recipient sequence number.
  *1016*

Receive an incoming update at a messaging endpoint from a recipient update queue, the incoming update comprising an incoming recipient sequence number.
1022

Add the incoming update to a message inbox on the messaging endpoint, the incoming update added to the message inbox in an order determined by the incoming recipient sequence number.
1024

Determine based on the incoming recipient sequence number whether one or more additional updates are missing from the message inbox on the messaging endpoint.
1026

Receive an incoming update at a snapshot component.
*1042*

Retrieve a messaging snapshot for a user associated with the incoming update.
*1044*

Add the incoming update to the messaging snapshot.
*1046*

Remove an oldest update of the messaging snapshot from the messaging snapshot.
*1048*

```
Receive an incoming update at a recipient update queue, the
recipient update queue associated with a recipient of the
incoming update.
1062
```

```
Add the incoming update to the recipient update queue.
1064
```

```
Determine a recipient messaging endpoint to receive the
incoming update.
1066
```

```
Retrieve one or more recipient messaging endpoint parameters
associated with the recipient messaging endpoint.
1068
```

```
Generate a customized incoming update from the incoming
update according to the one or more recipient messaging
endpoint parameters.
1070
```

```
Transmit the customized incoming update to the recipient
messaging endpoint.
1072
```

*FIG. 10D*

TECHNIQUES FOR INTELLIGENT MESSAGING FOR MESSAGE SYNCING

RELATED APPLICATIONS

This application claims the benefit of priority under 35 U.S.C. § 119(e) to U.S. Provisional Patent Application No. 62/035,663, titled "Techniques for a Persistent Queue for Message Syncing," filed on Aug. 11, 2014, which is hereby incorporated by reference in its entirety. This application claims the benefit of priority under 35 U.S.C. § 119(e) to U.S. Provisional Patent Application No. 62/035,665, titled "Techniques for a Sequential Message Reader for Message Syncing," filed on Aug. 11, 2014, which is hereby incorporated by reference in its entirety. This application claims the benefit of priority under 35 U.S.C. § 119(e) to U.S. Provisional Patent Application No. 62/035,668, titled "Techniques for Hot Snapshots for Message Syncing," filed on Aug. 11, 2014, which is hereby incorporated by reference in its entirety. This application claims the benefit of priority under 35 U.S.C. § 119(e) to U.S. Provisional Patent Application No. 62/035,673, titled "Techniques for Intelligent Messaging for Message Syncing," filed on Aug. 11, 2014, which is hereby incorporated by reference in its entirety.

This application is related to a U.S. patent application Ser. No. 14/621,846 with a shared specification and drawings, titled "Techniques for a Persistent Queue for Message Syncing," filed on Feb. 13, 2015, which is hereby incorporated by reference in its entirety. This application is related to a U.S. patent application Ser. No. 14/621,851 with a shared specification and drawings, titled "Techniques for a Sequential Message Reader for Message Syncing," filed on Feb. 13, 2015, which is hereby incorporated by reference in its entirety. This application is related to a U.S. patent application Ser. No. 14/621,865 with a shared specification and drawings, titled "Techniques for Hot Snapshots for Message Syncing," filed on Feb. 13, 2015, which is hereby incorporated by reference in its entirety.

BACKGROUND

Internet users may engage in communication with each other, such as through the exchange of messages. Users may compose messages to each other on computing devices and transmit them to each other, such as via an intermediary messaging platform. Users may have accounts registered with the intermediary messaging platform establishing an address at which they may be contacted. The users may compose and submit their messages using these addresses. Users may receive their correspondence at their address by accessing the intermediary messaging platform with their address and a password associated with their account.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for a persistent queue for message syncing. Some embodiments are particularly directed to techniques for a persistent queue for message syncing in which a strict sequencing of updates is maintained to advance messaging endpoint sync efficiency.

In one embodiment, for example, an apparatus may comprise a recipient inbound messaging component, a recipient queue management component, and a recipient outbound messaging component. The recipient inbound messaging component may be operative to receive an incoming update at a recipient update queue, the recipient update queue associated with a recipient of the incoming update. The recipient queue management component may be operative to determine an incoming recipient sequence number for the recipient update queue, the incoming recipient sequence number determined by incrementing a highest current recipient sequence number for the recipient update queue, assign the incoming recipient sequence number to the incoming update, add the incoming update to the recipient update queue, determine a current recipient sequence number for a current recipient update state of a recipient messaging endpoint associated with the recipient of the incoming update, determine that the incoming recipient sequence number is greater than the current recipient sequence number for the current recipient update state of the recipient messaging endpoint, and update the current recipient sequence number for the current recipient update state of the recipient messaging endpoint to be at least the incoming recipient sequence number. The recipient outbound messaging component may be operative to transmit the incoming update to the recipient messaging endpoint based on the determination that the incoming recipient sequence number is greater than the current recipient sequence number.

Various embodiments are generally directed to techniques for a sequential message reader for message syncing. Some embodiments are particularly directed to techniques for a sequential message reader for message syncing in which a strict sequencing of updates is maintained to advance messaging endpoint sync efficiency.

In another embodiment, an apparatus may comprise a network component and an inbox management component. The network component may be operative to receiving an incoming update at a messaging endpoint from a recipient update queue, the incoming update comprising an incoming recipient sequence number. The inbox management component may be operative to add the incoming update to a message inbox on the messaging endpoint, the incoming update added to the message inbox in an order determined by the incoming recipient sequence number and determine based on the incoming recipient sequence number whether one or more additional updates are missing from the message inbox on the messaging endpoint.

Various embodiments are generally directed to techniques for hot snapshots for message syncing. Some embodiments are particularly directed to techniques for hot snapshots for message syncing in which a strict sequencing of updates is maintained to advance messaging endpoint sync efficiency.

In another embodiment, an apparatus may comprise a network component and a snapshot component. The network component may be operative to receiving an incoming update. The snapshot component may be operative to retrieve a messaging snapshot for a user associated with the incoming update; identify a messaging thread corresponding to the incoming update; apply the incoming update to the messaging thread; determining that a number of messaging threads stored in the messaging snapshot is greater than a thread storage limit for the messaging snapshot; identify a least-recently-updated messaging thread currently stored in the messaging snapshot; and remove the least-recently updated messaging thread from the messaging snapshot.

Various embodiments are generally directed to techniques for intelligent messaging for message syncing. Some embodiments are particularly directed to techniques for intelligent messaging for message syncing in which a strict sequencing of updates is maintained to advance messaging endpoint sync efficiency.

In another embodiment, an apparatus may comprise a recipient inbound messaging component, a recipient queue management component, a recipient update customization component, and a recipient outbound messaging component. The recipient inbound messaging component may be operative to receive an incoming update at a recipient update queue, the recipient update queue associated with a recipient of the incoming update. The recipient queue management component may be operative to add the incoming update to the recipient update queue and determine a recipient messaging endpoint to receive the incoming update. The recipient update customization component may be operative to retrieve one or more recipient messaging endpoint parameters associated with the recipient messaging endpoint and generate a customized incoming update from the incoming update according to the one or more recipient messaging endpoint parameters. The recipient outbound messaging component may be operative to transmit the customized incoming update to the recipient messaging endpoint.

Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 10A illustrates an embodiment of a first logic flow for the system of FIG. 1.

FIG. 10B illustrates an embodiment of a second logic flow for the system of FIG. 1.

FIG. 10C illustrates an embodiment of a third logic flow for the system of FIG. 1.

FIG. 10D illustrates an embodiment of a fourth logic flow for the system of FIG. 1.

DETAILED DESCRIPTION

Figure 1:
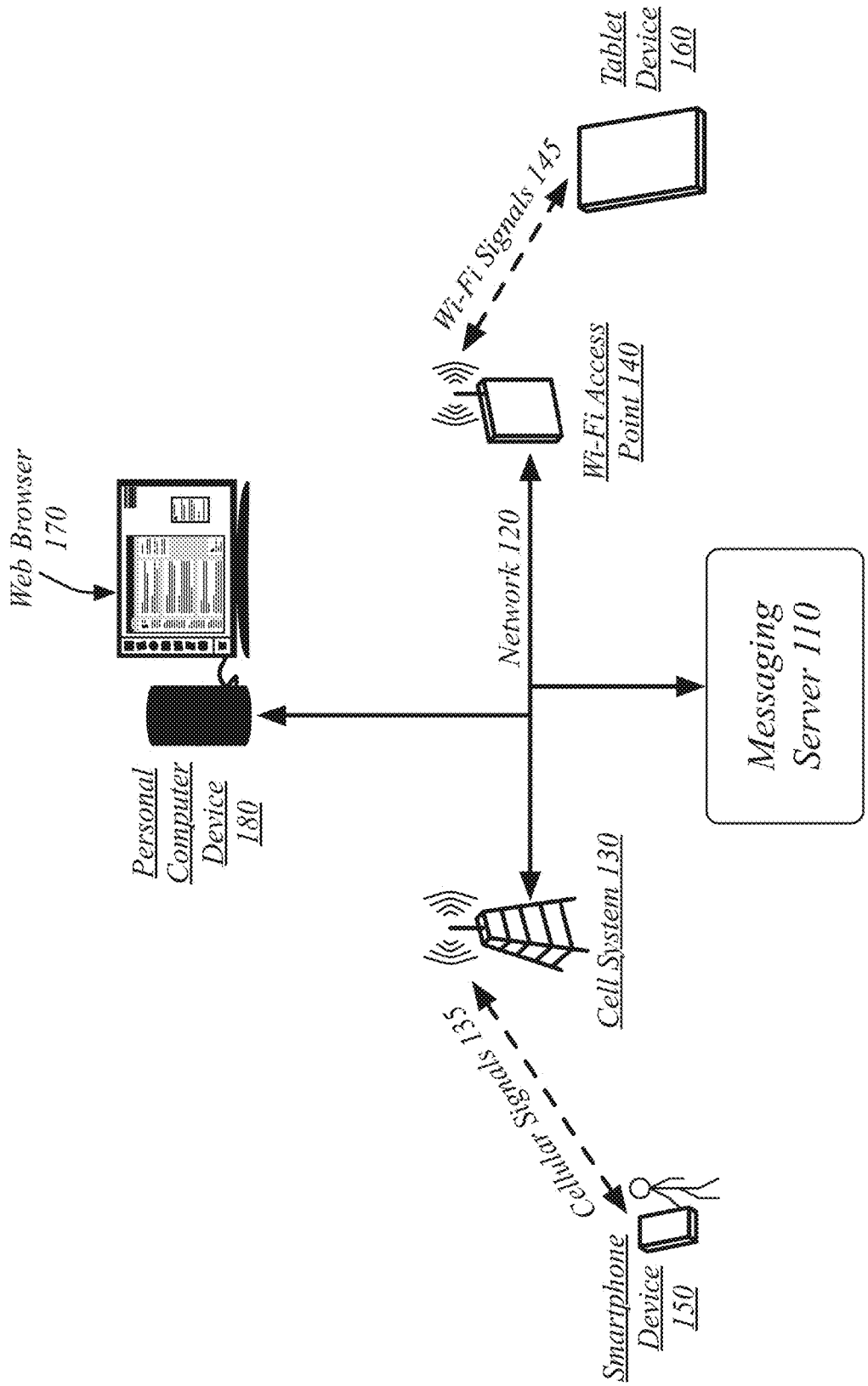
FIG. 1 illustrates an embodiment of a messaging system.

Various embodiments are directed to techniques for updating multiple messaging endpoints using a persistent update queue that maintains state for each of the multiple messaging endpoints. These techniques are particularly directed to cases in which the messaging endpoints are bandwidth-limited, such as for mobile devices that commonly operate on a cellular network.

A message service may operate by defining a messaging inbox as comprising a plurality of messages, wherein each message is an individual transaction of communication between two or more participants. A mail server may operate by maintaining a message index for the messaging inbox. Mail servers may receive messages and store the messages in mail archives from which messages may be retrieved through reference to the message index. Mail clients may connect to the mail servers and retrieve messages that have been added to their mail archive since their last update. The mail clients may receive a mail index from the mail archive indicating what messages are stored in the mail archive. The mail clients may compare the mail archive to their current inbox in order to determine what messages they are missing, which they then request from the mail archive. The mail clients may make changes to their inbox, which results in mail inbox instructions being transmitted to the mail archives instructing the mail archives in modifications to make to the representation of their mail inbox on the mail archives.

Unfortunately, the transmission of a messaging inbox index may involve a large transfer of data inappropriate for mobile devices. Instead, a messaging endpoint may benefit from a messaging platform transmitting it atomic updates to the message inbox that iteratively update the message inbox on the messaging endpoint from its existing state to the current state reflected at the messaging platform. Further, the messaging endpoint may benefit from the messaging platform maintaining the current update state of the message inbox on the messaging endpoint. When the messaging endpoint connects to the messaging platform, or otherwise becomes network-accessible, the messaging platform may determine whether the messaging endpoint has any updates pending without the messaging endpoint having to update the messaging platform as to its current status.

Further, a messaging endpoint with intermittent connectivity may, during a period of connectivity, receive a subset of the available updates and be left in a consistent state. A messaging endpoint may gain connectivity, receive the subset of available updates, lose connectivity, and during the period of disconnection the user may read any new messages that were received. Once connectivity is reestablished the update process may resume, the messaging endpoint receiving some or all of the remaining updates from the messaging platform.

As a result, the embodiments may reduce the bandwidth used and radio activity used by a mobile device to maintain a message inbox. As such, users may receive an improved messaging experience and the messaging platform may experience improved user satisfaction.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 may include components 122-1, 122-2, 122-3, 122-4 and 122-5. The embodiments are not limited in this context.

Persistent Queue

FIG. 1 illustrates a messaging system 100 in the context of an operating environment for a user. As shown in FIG. 1, a user may make use of a plurality of computing devices with a messaging server 110.

The messaging server 110 may be one of a plurality of messaging servers operating by a messaging platform as part of the messaging system 100. The messaging server 110 may comprise an Internet-accessible server, with the network 120 connecting the various devices of the messaging system 100 comprising, at least in part, the Internet.

A user may own and operate a smartphone device 150. The smartphone device 150 may comprise an iPhone® device, an Android® device, a Blackberry® device, or any other mobile computing device conforming to a smartphone form. The smartphone device 150 may be a cellular device capable of connecting to a network 120 via a cell system 130 using cellular signals 135. In some embodiments and in some cases the smartphone device 150 may additionally or alternatively use Wi-Fi or other networking technologies to connect to the network 120. The smartphone device 150 may execute a messaging client, web browser, or other local application to access the messaging server 110.

The same user may own and operate a tablet device 160. The tablet device 150 may comprise an iPad® device, an Android® tablet device, a Kindle Fire® device, or any other mobile computing device conforming to a tablet form. The tablet device 160 may be a Wi-Fi device capable of connecting to a network 120 via a Wi-Fi access point 140 using Wi-Fi signals 145. In some embodiments and in some cases the tablet device 160 may additionally or alternatively use cellular or other networking technologies to connect to the network 120. The tablet device 160 may execute a messaging client, web browser, or other local application to access the messaging server 110.

The same user may own and operate a personal computer device 180. The personal computer device 180 may comprise a Mac OS® device, Windows® device, Linux® device, or other computer device running another operating system. The personal computer device 180 may be an Ethernet device capable of connecting to a network 120 via an Ethernet connection. In some embodiments and in some cases the personal computer device 180 may additionally or alternatively use cellular, Wi-Fi, or other networking technologies to the network 120. The personal computer device 180 may execute a messaging client, web browser 170, or other local application to access the messaging server 110.

A messaging client may be a dedicated messaging client. A dedicated messaging client may be specifically associated with a messaging provider administering the messaging platform including the messaging server 110. A dedicated messaging client may be a general client operative to work with a plurality of different messaging providers including the messaging provider administering the messaging platform including the messaging server 110.

The messaging client may be a component of an application providing additional functionality. For example, a social networking service may provide a social networking application for use on a mobile device for accessing and using the social networking service. The social networking service may include messaging functionality such as may be provided by messaging server 110. It will be appreciated that the messaging server 110 may be one component of a computing device for the social networking service, with the computing device providing additional functionality of the social networking service. Similarly, the social networking application may provide both messaging functionality and additional social networking functionality.

In some cases a messaging endpoint may retain state between user sessions and in some cases a messaging endpoint may relinquish state between user session. A messaging endpoint may use a local store to retain the current state of a message inbox. This local store may be saved in persistent storage such that the state may be retrieved between one session and the next, including situations in which, for example, a local application is quit or otherwise removed from memory or a device is powered off and on again. Alternatively, a messaging endpoint may use a memory cache to retain the current state of a message inbox but refrain from committing the state of the message inbox to persistent storage.

A messaging endpoint that retains the state of a message inbox may comprise a dedicated messaging application or a messaging utility integrated into another local application, such as a social networking application. A messaging endpoint that relinquishes state of a message inbox may comprise messaging access implemented within a web browser. In one embodiment, a web browser, such as web browser 170 executing on personal computer device 180, may execute HTML5 code that interacts with the messaging server to present messaging functionality to a user.

A user may send and receive messages from a plurality of devices, including the smartphone device 150, tablet device 160, and personal computer device 180. The user may use a first messaging application on the smartphone device 150, a second messaging application on the tablet device 160, and the web browser 170 on the personal computer device 180. The first and second messaging applications may comprise installations of the same application on both devices. The first and second messaging applications may comprise a smartphone-specific and a tablet-specific version of a common application. The first and second messaging application may comprise distinct applications.

The user may benefit from having their message inbox kept consistent between their devices. A user may use their smartphone device 150 on the cell system 130 while away from their home, sending and receiving messages via the cells system 130. The user may stop by a coffee shop, or other location offering Wi-Fi, and connect their tablet device 160 to a Wi-Fi access point 140. The tablet device 160 may retrieve its existing known state for the message inbox and receive updates that have happened since the last occasion on which the tablet device 160 had access to a network, including any messages sent by the smartphone device 150 and that may have been received by the user while operating the smartphone device 150. The user may then return home and access their message inbox using a web browser 170 on a personal computer device 180. The web browser 170 may receive a snapshot of the current state of the message inbox from the messaging server 110 due to it not maintaining or otherwise not having access to an existing state for the message inbox. The web browser 170 may then retrieve incremental updates for any new changes to the state of the message inbox so long as it maintains a user session with the messaging server 110, discarding its known state for the message inbox at the end of the session, such as when the web browser 170 is closed by the user.

Figure 2:
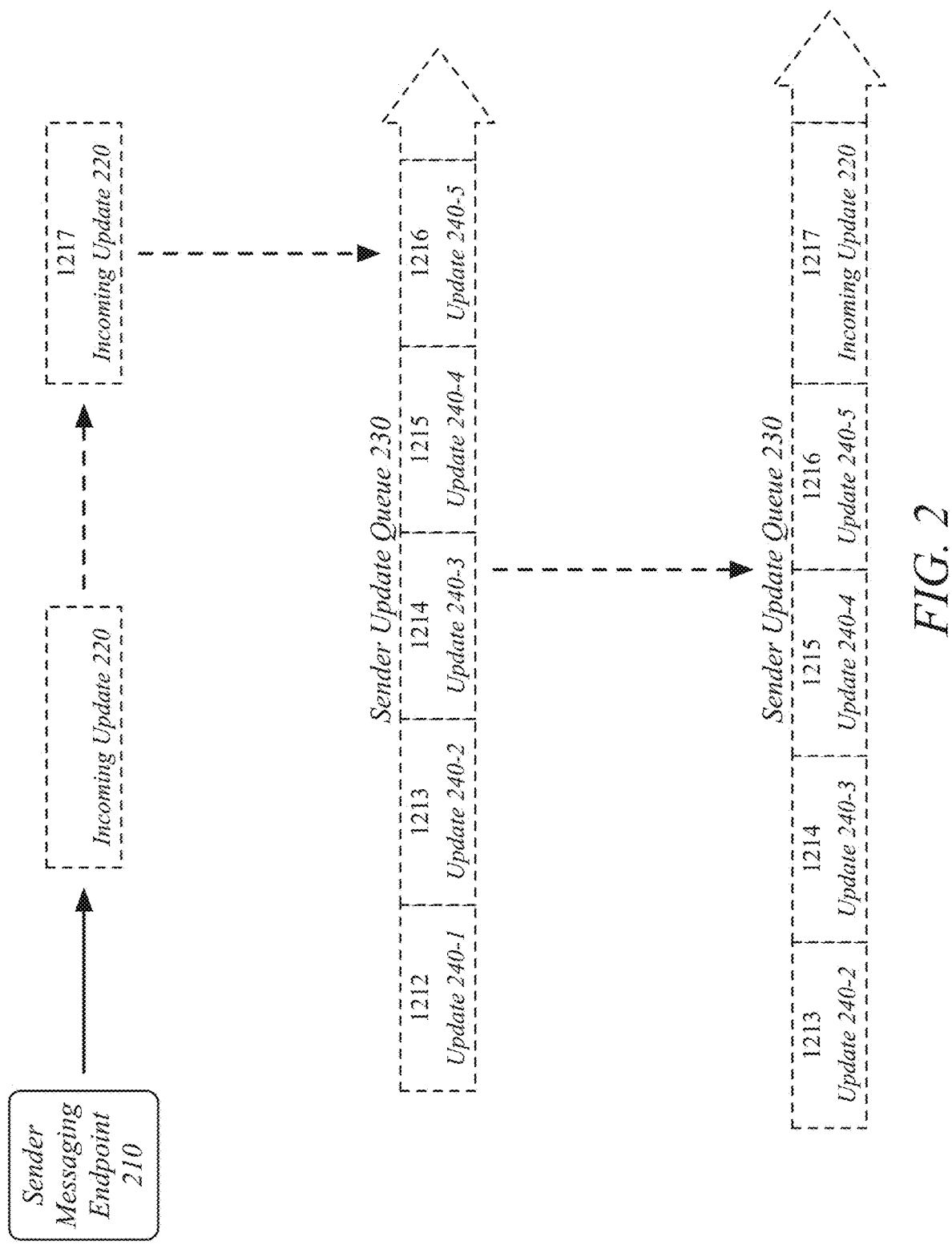
FIG. 2 illustrates an embodiment of an incoming messaging being added to a sender update queue.

FIG. 2 illustrates an embodiment of an incoming update 220 being added to a sender update queue 230.

A sender messaging endpoint 210 may represent any one of a plurality of messaging endpoints used by a user in conjunction with a messaging platform. The incoming update 220 may represent any one of a plurality of types of updates supported by the messaging system 100. The incoming update 220 may generally correspond to an atomic modification to a message inbox. The incoming update 220 may comprise a new message addressed to one or more users of the messaging system 100. The incoming update 220 may comprise a deletion from a message inbox of a message. The incoming update 220 may comprise a notification that a message received by the sender of the incoming update 220 has been read. The incoming update 220 may comprise any modification to the state of the message inbox, and in particular a single modification operative to be performed via an atomic interaction with a message store.

The incoming update 220 may be received at a sender update queue 230. The sender update queue 230 may be specifically associated with the user of sender messaging endpoint 210, such as by being uniquely associated within the messaging system 100 with a user account for the user of sender messaging endpoint 210. The sender update queue 230 may be a single queue used for all messaging endpoints used by this user.

The sender update queue 230 may comprise a representation of updates in a strict linear order with a monotonically and incrementally increasing assignment of sequence numbers to represent the strict linear order of updates. The sender update queue 230 may be organized as a data unit according to a variety of techniques. The sender update queue 230 may be stored in semi-persistent memory, persistent storage, both semi-persistent memory and persistent storage, or a combination of the two. The sender update queue 230 may be organized according to a variety of data structures, including linked lists, arrays, and other techniques for organizing queues. The sender update queue 230 may generally comprise a first-in-first-out (FIFO) queue in which no update will be removed from the queue before any updates that were received prior to it. This may be enforced through a strict requirement that the updates stored in the queue include a complete set of the integer sequence numbers from the oldest update in the sender update queue 230 to the newest update in the sender update queue 230.

Upon reception, an incoming sender sequence number may be determined for the sender update queue 230, the incoming sender sequence number determined by incrementing a highest current sender sequence number for the sender update queue 230. The sender update queue 230, as depicted in FIG. 2, already contains updates 240, comprising updates 240-1, 240-2, 240-3, 240-4, and 240-5. These fives updates have already been assigned sequence numbers, respectively "1212," "1213," "1214," "1215," and "1216." As such, the incoming update 220 may be assigned the sequence number "1217," which is one greater than the highest current sender sequence number "1216."

The incoming update 220, with the incoming sender sequence number "1217" assigned to it, may then be added to the sender update queue 230. In the illustrated embodiment of FIG. 2, update 240-1, with sequence number "1212," was removed from the sender update queue 230 in response to incoming update 220 being added. Update 240-1 was the oldest update still in the sender update queue 230 and was therefore the first update to be removed given that any update was removed. This may represent that, in some embodiments, sender update queue 230 may have a fixed or maximum size. Where sender update queue 230 is a fixed-size queue, an oldest update may be removed from the sender update queue 230 in FIFO order whenever a new update is added, possibly excluding an initial period after the creation of sender update queue 230 during which the fixed size is reached. Where sender update queue 230 is a queue with a maximum, an oldest update may be removed from the sender update queue 230 in FIFO order whenever a new update is added if the sender update queue 230 is already at its maximum size, but there may also be other circumstances in which updates are removed from the queue even where a new update would not take the sender update queue 230 above its defined maximum size. A fixed or maximum size of an update queue may be a defined parameter for a messaging server 110 or messaging system 100.

Figure 3:
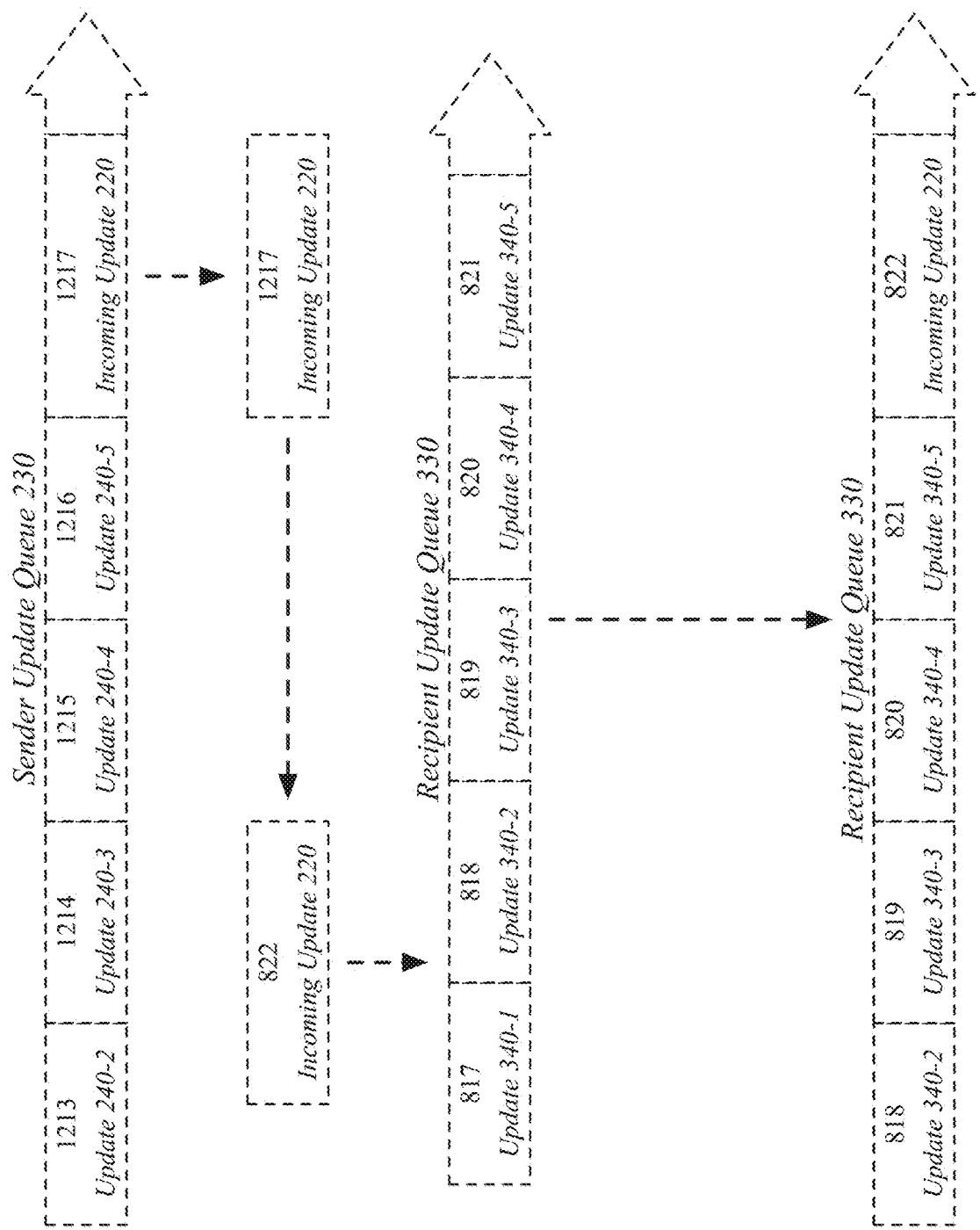
FIG. 3 illustrates an embodiment of an incoming update being forwarded from a sender update queue to a recipient update queue.

FIG. 3 illustrates an embodiment of an incoming update 220 being forwarded from a sender update queue 230 to a recipient update queue 330.

The incoming update 220 may be received at a recipient update queue 330 from the sender update queue 230. The recipient update queue 330 may be associated with one recipient of one or more recipients of the incoming update 220. A recipient may be determined for an incoming update 220 according to a variety of criteria. Where the incoming update 220 corresponds to a new message being sent to other users, the recipients of the update 220 may comprise a recipient list created as part of the composition of the new message by the sender. Where the incoming update 220 corresponds to an updated status of the sender on a social networking service, the recipient list may be determined by the social networking service based on relationships (e.g., friends, follows, likes) of which the sender is part. Where the incoming update 220 corresponds to a posted item shared on a network, the recipient list may be determined by the network based on users tagged in the shared item (e.g., users tagged as present in a photo). Where the incoming update 220 corresponds to a modification to a user's inbox, such as the deletion of a message, flagging a priority for a message, flagging a message as read, or other interaction only or primarily relevant to the user with which the message inbox is associated, the recipient list may be empty, such that no other users—and therefore no other message queues—receive the incoming update 220.

As with the sender update queue 230, the recipient update queue 330 may comprise a representation of updates in a strict linear order with a monotonically and incrementally increasing assignment of sequence numbers to represent the strict linear order of updates. The recipient update queue 330 may generally comprise a first-in-first-out (FIFO) queue in which no update will be removed from the queue before any updates that were received prior to it. This may be enforced through a strict requirement that the updates stored in the queue include a complete set of the integer sequence numbers from the oldest update in the recipient update queue 330 to the newest update in the recipient update queue 330. The recipient update queue 330 may be organized as a data unit according to a variety of techniques.

Upon reception, an incoming recipient sequence number may be determined for the recipient update queue 330, the incoming recipient sequence number determined by incrementing a highest current recipient sequence number for the recipient update queue 330. The recipient update queue 330, as depicted in FIG. 3, already contains updates 340, comprising updates 340-1, 340-2, 340-3, 340-4, and 340-5. These fives updates have already been assigned sequence numbers, respectively "817," "818," "819," "820," and "821." As such, the incoming update 220 may be assigned the sequence number "822," which is one greater than the highest current sender sequence number "822."

The incoming update 220 may, therefore, have a different sequence number at each of the sender update queue 230 and the recipient update queue 330. Due to the requirement that the sequence numbers for a given queue be strictly in sequence and define a strict ordering, the sequence numbers for the incoming update 220 in each update queue are different to reflect the position of the incoming update 220 in each update queue.

The incoming update 220, with the incoming sender sequence number "822" assigned to it, may then be added to the recipient update queue 330. In the illustrated embodiment of FIG. 3, update 340-1, with sequence number "817," was removed from the recipient update queue 330 in response to incoming update 220 being added. As with sender update queue 230, the recipient update queue 330 may be a fixed-size queue or queue with a defined maximum size. It will be appreciated that a defined fixed size or maximum size may be globally defined for all update queues or may be individually defined for different update queues. For instance, users with a higher throughput of updates, such as may correspond to more frequent use of the messaging system 100, may be allowed larger update queues. Users may be able to purchase larger maximum or fixed update queue sizes as a premium feature. The maximum or fixed size of an update queue may be automatically adjusted for a user to minimize the occurrence of a messaging endpoint for the user connecting to that user's update queue and finding that updates which it has not yet received have been removed from the update queue due to the maximum or fixed size restriction.

Figure 4:
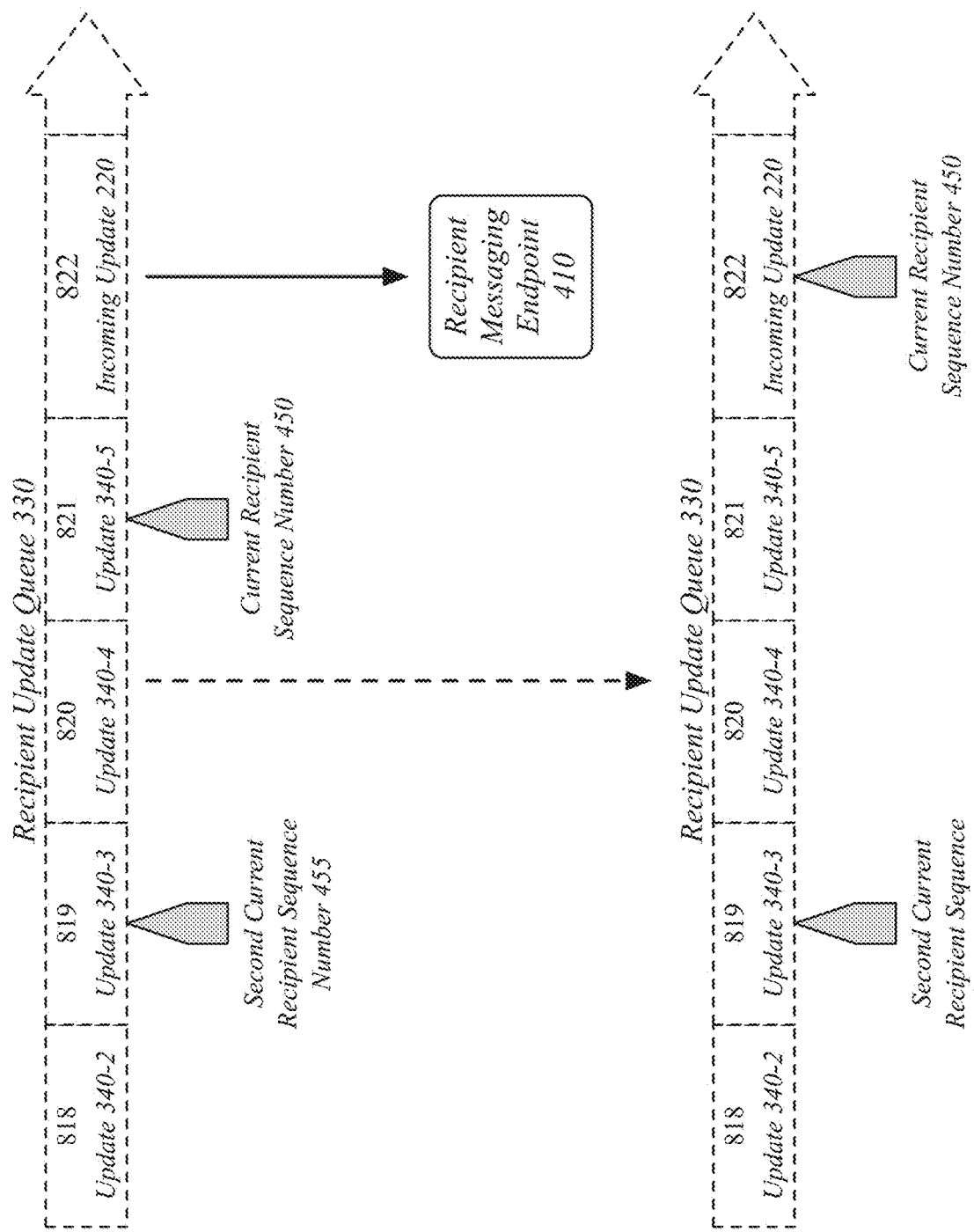
FIG. 4 illustrates an embodiment of an incoming messaging being sent from a recipient update queue to a recipient messaging endpoint.

FIG. 4 illustrates an embodiment of an incoming messaging 220 being sent from a recipient update queue 330 to a recipient messaging endpoint 410.

A sender messaging endpoint 410 may represent any one of a plurality of messaging endpoints used by a user in conjunction with a messaging platform. The recipient update queue 330 may be specifically associated with the user of recipient messaging endpoint 410, such as by being uniquely associated within the messaging system 100 with a user account for the user of recipient messaging endpoint 410. The recipient update queue 330 may be a single queue used for all messaging endpoints used by this user.

It will be appreciated that the scenario in which an incoming update 220 is transmitted from a sender messaging endpoint 210 to a sender update queue 230 to a recipient update queue 330 to a recipient messaging endpoint 410 may represent only one possible flow of a plurality of flows of an update through the messaging system 100. It may specifically correspond to a flow in which the incoming update 220 is a new message being sent from a sender at the sender messaging endpoint 210 to a receiver at the receiver messaging endpoint 410. In other situations a messaging endpoint such as the recipient messaging endpoint 410 or the sender messaging endpoint 210 may interact with their respective queues without an update being forwarded to another queue.

For example, the sender may remove a message from their associated message inbox at the sender messaging endpoint 210, which may cause the sender messaging endpoint 210 to submit an incoming update 220 to the sender message queue 230 indicating this change. The sender messaging endpoint 210 may then receive the incoming update 220 back from the sender message queue 230 with its assigned sequence number indicating that the change has been applied and informing the sender messaging endpoint 210 of the sequence number to aid the sender messaging endpoint 210 in maintaining synchronization with the sender message queue 230. The incoming update 220 may also be distributed to other messaging endpoint for the sender.

A current recipient sequence number 450 may be determined for a current update state of the recipient messaging endpoint 410 associated with the recipient of the incoming update 220. Where the incoming update 220 is received from a distinct sender, the recipient of the incoming update 220 may comprise an addressed recipient of a message in addition to the sender of the message receiving their own incoming update 220 to acknowledge its receipt by the messaging system 100. Where the incoming update 220 is restricted in relevance to a single user's messaging inbox, the recipient of the incoming update 220 may be the same user initiating the production of the incoming update 220.

The current recipient sequence number 450 may be retrieved by identifying the recipient messaging endpoint 410 and retrieving the current recipient sequence number 450 from a data store used for the maintenance of the recipient update queue 330. In some cases, such as where a plurality of recipient messaging endpoints are used by the recipient user, a plurality of current recipient sequence numbers may be stored in association with the recipient update queue 330. Each of the plurality of current recipient sequence numbers may correspond to a current recipient update state of one of the plurality of recipient messaging endpoints. For instance, a second current recipient sequence number 455 may be associated with the recipient update queue 330 and a different recipient messaging endpoint than the recipient messaging endpoint 410. For example, the recipient messaging endpoint 410 may correspond to the smartphone device 150 of FIG. 1 while a second recipient messaging endpoint may correspond to the tablet device 160.

Determining the current recipient sequence number 450 for the current recipient update state of the recipient messaging endpoint 410 may comprise retrieving the current recipient sequence number 450 based on an identifier for the recipient messaging endpoint 410. Each of the plurality of recipient messaging endpoints for the recipient user may be associated with an identifier. The recipient update queue 330 may be stored in association with a plurality of identifiers each corresponding to a particular recipient messaging endpoints, with each of the plurality of identifiers associated with a current recipient sequence number reflecting the current update state of the associated recipient messaging endpoint. The current recipient sequence numbers may be explicitly stored as being the sequence number for the recipient update queue 330 that corresponds to the last or most-recent update of the plurality of updates 340 that each recipient messaging endpoint has received. For instance, the recipient messaging endpoint 410 may be up-to-date with the recipient update queue 330 as far as the update 340-5 immediately prior to the just-added incoming update 220. As such, the current recipient sequence number 450 for the recipient messaging endpoint 410 may be "821," the sequence number assigned to the update 340-5 at the recipient update queue 330.

Alternatively or additionally, an identifier for a recipient messaging endpoint may include a link or other logical connection to the particular update that is the most-recent, in regards to the ordering of the recipient update queue 330, that the recipient messaging endpoint has received. This may empower, for example, the messaging server 110 to retrieve the link or other logical connection based on the identifier for the recipient messaging endpoint 410 and follow the link to a position within the recipient update queue 330 that allows for immediate traversal through the recipient update queue 330 of those updates that the recipient messaging endpoint 410 has not yet received. Similarly, a data structure for the recipient update queue 330 may contain an entry, link, or other signifiers to indicate one or more recipient messaging endpoints for which it is the most-recent update transmitted to that recipient messaging endpoint. Any combination of these techniques may be used.

It will be appreciated that the most-recent update transmitted to a recipient messaging endpoint may comprise the update that is most-recent according to the ordering provided by the recipient update queue 330. In some cases, a recipient messaging endpoint 410 may receive updates out-of-order due to, for example, network transmission problems. While the messaging server 110 may endeavor to transmit the atomic updates represented by the updates 340 to recipient messaging endpoints such as recipient messaging endpoint 410 in the order that they should be applied, where a sequence of updates is transmitted an update in the middle of the sequence may be lost while a later sequence us received. The missed update may be retransmitted from the messaging server 110 to the recipient messaging endpoint 410 upon recognition that the update was missed, and therefore be the most-recent update transmitted in terms of transmission order, but not be the most-recent update in terms of the ordering provided by the recipient update queue 330. The current recipient sequence number 450 for the recipient messaging endpoint 410 may therefore correspond to the sequence number for the update latest in the ordering of the recipient update queue 330 received by the recipient messaging endpoint 410 or known to have been received by the recipient messaging endpoint 410 by the messaging server 110.

It may be determined that the incoming recipient sequence number for the incoming update 220 is greater than the current recipient sequence number 450 for the current recipient update state of the recipient messaging endpoint 410. This may indicate that the incoming update 220 has not yet been received by the recipient messaging endpoint 410. Where the incoming update 220 has just been added to the recipient update queue 330, this may be due to their not having yet been an opportunity to transmit the incoming update 220 to the recipient messaging endpoint 410. However, in some cases, the incoming update 220 may have been in the recipient update queue 330, available for transmission, but not yet transmitted to the recipient messaging endpoint 410 due to unavailability of the recipient messaging endpoint 410.

As such, the incoming update 220 may be transmitted to the recipient messaging endpoint 410 in response to the recipient messaging endpoint 410 becoming available. The recipient messaging endpoint 410 may transmit an update request to the messaging server 110 in order to receive any updates it has not yet received, such as incoming update 220. The update request 110 may be an explicit request for updates or may be an implicit request based upon the availability of a network connection the recipient messaging endpoint 410. The update request may include the identifier for the recipient messaging endpoint 410 to empower the retrieval of the current recipient sequence number 450. Where the update request is implicit, the identifier may be transmitted as part of a security procedure for the establishment of the connection, such as being included in the transmission of a security token from the recipient messaging endpoint 410 to the messaging system 100. The update request may include the current recipient update state of the recipient messaging endpoint 410.

The incoming update 220 may be transmitted to the recipient messaging endpoint 410 based on the determination that the incoming recipient sequence number for the incoming update 220 is greater than the current recipient sequence number 450. As the recipient messaging endpoint 410 is available and has not yet received the incoming update 220, the incoming update 220 is provided to the recipient messaging endpoint 410.

The current recipient sequence number 450 for the current recipient update state of the recipient messaging endpoint 410 may then be updated to be at least the incoming recipient sequence number. As shown in FIG. 4, the current recipient sequence number 450 has been changed to indicate that the incoming update 220 has been received by the recipient messaging endpoint 410 associated with the current recipient sequence number 450. Where the incoming update 220 is the most-recent update in the recipient update queue 330, the current recipient sequence number 450 may be set to be precisely the incoming recipient sequence number associated with the incoming update 220. However, where newer updates are also available, those updates may also be transmitted to the recipient messaging endpoint 410, with the current recipient sequence number 450 set to be the sequence number for the most-recent of those updates, and therefore a greater value than the incoming recipient sequence number.

In some embodiments, the removal of updates from an update queue such as the recipient update queue 330 may be performed when all messaging endpoints associated with the update queue have received those updates, such as may be indicated by the current sequence numbers for the messaging endpoints. For example, the user associated with the recipient messaging endpoint 410 may have two messaging endpoints associated with their user account, which may have current sequence numbers represented by the current recipient sequence number 450 and second current recipient sequence number 455. Second current recipient sequence number 455 indicates that a second recipient messaging endpoint is less up-to-date than the first recipient messaging endpoint 410, particularly after current recipient sequence number 450 is updated to indicate the transmission of the incoming update 220 to the first recipient messaging endpoint 410. However, as according to the current recipient sequence numbers, both recipient messaging endpoints for the recipient user have already received updates 340-2 and 340-3. Given this indication, updates 340-2 and 340-3 may be removed from the recipient update queue 330 due to those updates not longer being needed by any current messaging endpoint that is associated with the recipient update 330.

In general, a plurality of current recipient sequence numbers may be stored in association with the recipient update queue 330, each of the plurality of current recipient sequence numbers associated with a different recipient messaging endpoint. It may be determined that every current recipient sequence number of the plurality of current recipient sequence numbers is greater than a sequence number for an old update stored in the recipient update queue 330. In response to this determination, the old update may be removed from the recipient update queue 330.

In some cases, a current sequence number may be used for a messaging endpoint, such as a web browser 170, that does not maintain state between sessions. Because the messaging endpoint does not maintain state between sessions, it may not be advantageous to maintain a current sequence number for the messaging endpoint between the sessions of the messaging endpoint with the messaging server 110. Therefore, when a messaging endpoint that discards state between sessions connects to the messaging server 110 the messaging endpoint may be brought up-to-date, which may comprise receiving a current state of a messaging inbox from an archival mail server or inbox snapshot component. A current sequence number for the messaging endpoint may be established at the beginning of the messaging endpoint's session, such as in response to the messaging endpoint being brought up-to-date by an archival mail server or inbox snapshot component. The current sequence number for the messaging endpoint may be maintained during the session for the messaging endpoint and then discarded when the session ends.

Figure 5:
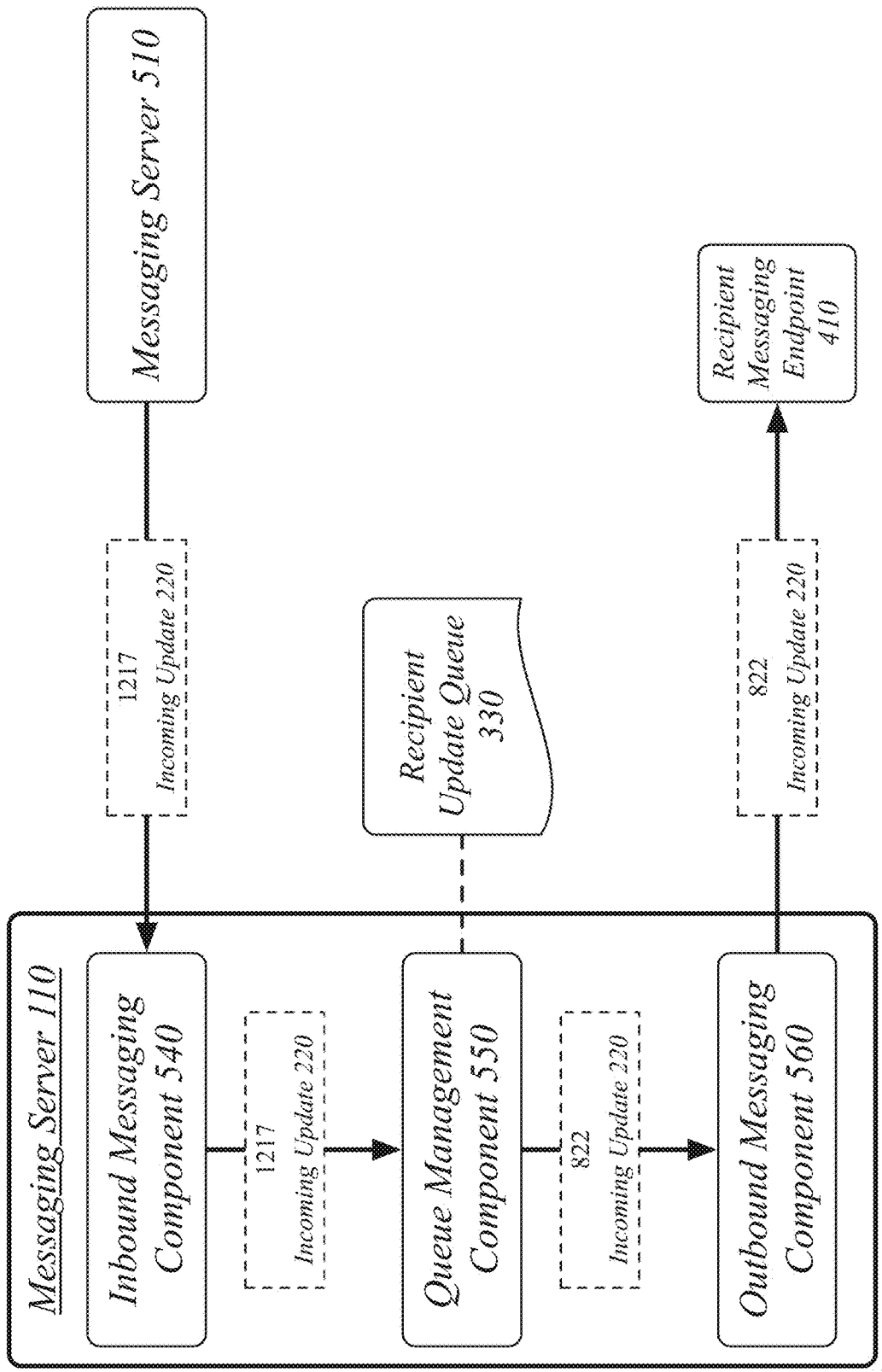
FIG. 5 illustrates an embodiment of a messaging server managing a recipient update queue.

FIG. 5 illustrates a block diagram for a messaging system 100. In one embodiment, the messaging system 100 may comprise a computer-implemented system including one or more software applications comprising one or more components. Although the messaging system 100 shown in FIG. 5 has a limited number of elements in a certain topology, it may be appreciated that the messaging system 100 may include more or less elements in alternate topologies as desired for a given implementation.

The messaging system 100 may comprise a messaging server 110. The messaging system 100 may comprise an additional messaging server 510. The messaging system 100 may comprise a plurality of messaging servers including the messaging server 110 and the messaging server 510.

The messaging server 110 may comprise an inbound messaging component 540. The inbound messaging component 540 may be generally arranged to receive an incoming update 220 at a recipient update queue 330, the recipient update queue 330 associated with a recipient of the incoming update 220. The messaging server 110 may comprise a messaging server to which the recipient is assigned, or may comprise a server currently executing various processes, such as messaging workers, executing functions for the messaging system 100.

The messaging server 110 may comprise a queue management component 550. The queue management component 550 may be operative to determine an incoming recipient sequence number for the recipient update queue 330, the incoming recipient sequence number determined by incrementing a highest current recipient sequence number for the recipient update queue 330, assign the incoming recipient sequence number to the incoming update 220, add the incoming update 220 to the recipient update queue 330, determine a current recipient sequence number 450 for a current recipient update state of a recipient messaging endpoint 410 associated with the recipient of the incoming update 220, determine that the incoming recipient sequence number is greater than the current recipient sequence number 450 for the current recipient update state of the recipient messaging endpoint 410, and update the current recipient sequence number 450 for the current recipient update state of the recipient messaging endpoint 410 to be at least the incoming recipient sequence number.

The messaging server 110 may comprise an outbound messaging component 560. The outbound messaging component may be operative to transmit the incoming update 220 to the recipient messaging endpoint 410 based on the determination that the incoming recipient sequence number is greater than the current recipient sequence number 450.

The incoming update 220 may correspond to an atomic modification to a message inbox for the recipient messaging endpoint 410. The recipient messaging endpoint 410 may comprise one of a messaging application on a device, such as a mobile device, and a web browser session. The recipient messaging endpoint 410 may comprise an archival mail server. The recipient messaging endpoint 410 may comprise a snapshot component maintaining a inbox snapshot for quick-setup of messaging inboxes.

The queue management component 550 may determine that a plurality of updates in the recipient update queue 330 are each associated with a sequence number greater than the current recipient sequence number 450 of the recipient messaging endpoint 410. The outbound messaging component 560 may transmit the plurality of updates to the recipient messaging endpoint 410 based on the determination that the plurality of updates in the recipient update queue 330 are each associated with a sequence number greater than the current recipient sequence number 450.

A plurality of current recipient sequence numbers may be stored in association with the recipient update queue 330. The queue management component 550 determining the current recipient sequence number 450 for the current recipient update state of the recipient messaging endpoint 410 may comprise the queue management component 550 retrieving the current recipient sequence number 450 based on an identifier for the recipient messaging endpoint 410.

Each of the plurality of current recipient sequence numbers may be associated with a different recipient messaging endpoint. The queue management component 550 may be operative to determine that every current recipient sequence number of the plurality of current recipient sequence numbers is greater than a sequence number for an old update stored in the recipient update queue 330 and remove the old update from the recipient update queue 330 in response to the determination that every current recipient sequence number of the plurality of current recipient sequence numbers is greater than the sequence number for the old update.

The queue management component 550 may be operative to receive a notification of an opening of a network connection with the recipient messaging endpoint 410 and retrieve the current recipient sequence number 450 for the current recipient update state of the recipient messaging endpoint 410 in response to receiving the notification of the opening of the network connection.

The queue management component 550 may be operative to check, in response to receiving the incoming update 220 at the recipient update queue 330, whether a network connection is already open with the recipient messaging endpoint 410, determine that the network connection is already open with the recipient messaging endpoint 410, and determine the current recipient sequence number 450 for the current recipient update state of the recipient messaging endpoint 410 in response to the determination that the network connection is already open with the recipient messaging endpoint 410. Alternatively, the outbound messaging component 560 may be operative to determine, in response to the determination that the incoming recipient sequence number is greater than the current recipient sequence number 450 for the current recipient update state of the recipient messaging endpoint 410, that a network connection is already open with the recipient messaging endpoint 410 and to transmit the incoming update 220 to the recipient messaging endpoint 410 based on the determination that the network connection is already open. Where a plurality of recipient messaging endpoints are associated with a recipient update queue 330, the queue management component 550 may be operative to check whether network connections are already open with any of the plurality of recipient messaging endpoints, determine that one or more network connections are already open with one or more of the plurality of recipient messaging endpoints, and determine one or more current recipient sequence numbers for one or more current recipient update states of the one or more recipient messaging endpoints in response to the determination that the one or more network connections are already open with the one or more recipient messaging endpoints.

It will be appreciated that multiple incoming updates may be stored in a sender update queue 230. In many cases, a plurality of incoming updates may be addressed to different recipients. As such, different incoming updates of the plurality of incoming updates may be forward to different recipient update queues. When processing a plurality of incoming updates, the queue management component 550 may determine one or more recipient update queues, wherein each of the plurality of incoming updates is associated with one or more of the one or more recipient update queues. A single incoming update may be associated with more than one recipient update queue when that update effects multiple recipients (e.g., is a message addressed to multiple recipients). The queue management component 550 may forward each incoming update to each of the recipient update queues it relates to. As such, updates passing through a single sender update queue 230 may result in multiple recipient update queues receiving updates.

The incoming update 220 may be received at the recipient update queue 330 from a sender update queue 230 associated with a sender of the incoming update. The sender update queue 230 may be maintained by a messaging server 510. The messaging server 510 may comprise a distinct messaging server or may be implemented by a same device as the first messaging server 110.

The incoming update 220 may received at the recipient update queue 330 from a group discussion thread update queue, the group discussion thread update queue associated with a group discussion thread. A group discussion thread may comprise any form of ongoing conversation between two or more parties. Multiple messages from the a single participant may be included within the group discussion thread. In some cases, a user that joins an ongoing group discussion thread may only be privy to messages posted to the group discussion thread after their arrival. In some cases, a user that joins an ongoing group discussion thread may have access to the some portion of or the entire history of the group discussion thread prior to their arrival.

A group discussion thread may be associated with a group discussion thread update queue substantially similar to the sender update queue 230 and recipient update queue 330. However, the group discussion thread update queue may be a temporary queue created to specifically track the progress of a group discussion thread and distribute updates to the group discussion thread to one or more messaging endpoints for one or more participants. The group discussion thread update queue may be deleted or otherwise removed from storage and active maintenance at conclusion of the discussion.

An inbound messaging component 540 may receive the incoming update 220 at the group discussion thread update queue from a sender messaging queue 230, determine an incoming group discussion thread sequence number for the group discussion thread update queue, the incoming group discussion thread sequence number determined by incrementing a highest current group discussion thread sequence number for the group discussion thread update queue, assign the incoming group discussion thread sequence number to the incoming update 220 at the group discussion thread update queue, add the incoming update 220 to the group discussion thread update queue, and queue one or more workers to forward the incoming update 220 to one or more recipient update queues, wherein each of the one or more recipient update queues is associated with a follower of the group discussion thread.

In another embodiment, updates may not pass through the message queues of the group discussion thread participants. Instead, the group discussion thread participants may subscribe to the group discussion thread and directly insert and/or retrieve updates into the group discussion thread update queue. This may make the messaging endpoints of the participants the direct subscribers of the group discussion thread queue rather than the updates for the group discussion thread queue being passed through their respective message queues.

Other special-purpose update queues may be created that are not associated with maintaining a message inbox for a particular user. For example, a network-based application may be associated with an application update queue. A particular instance of one or more user's interaction with an application may be associated with an application update queue. For example, communication for an online multi-player game may be implemented using an application update queue. Updates on the application update queue may correspond to player moves in the online multiplayer game, chat messages in a chat for the game, and other game status updates.

Figure 6:
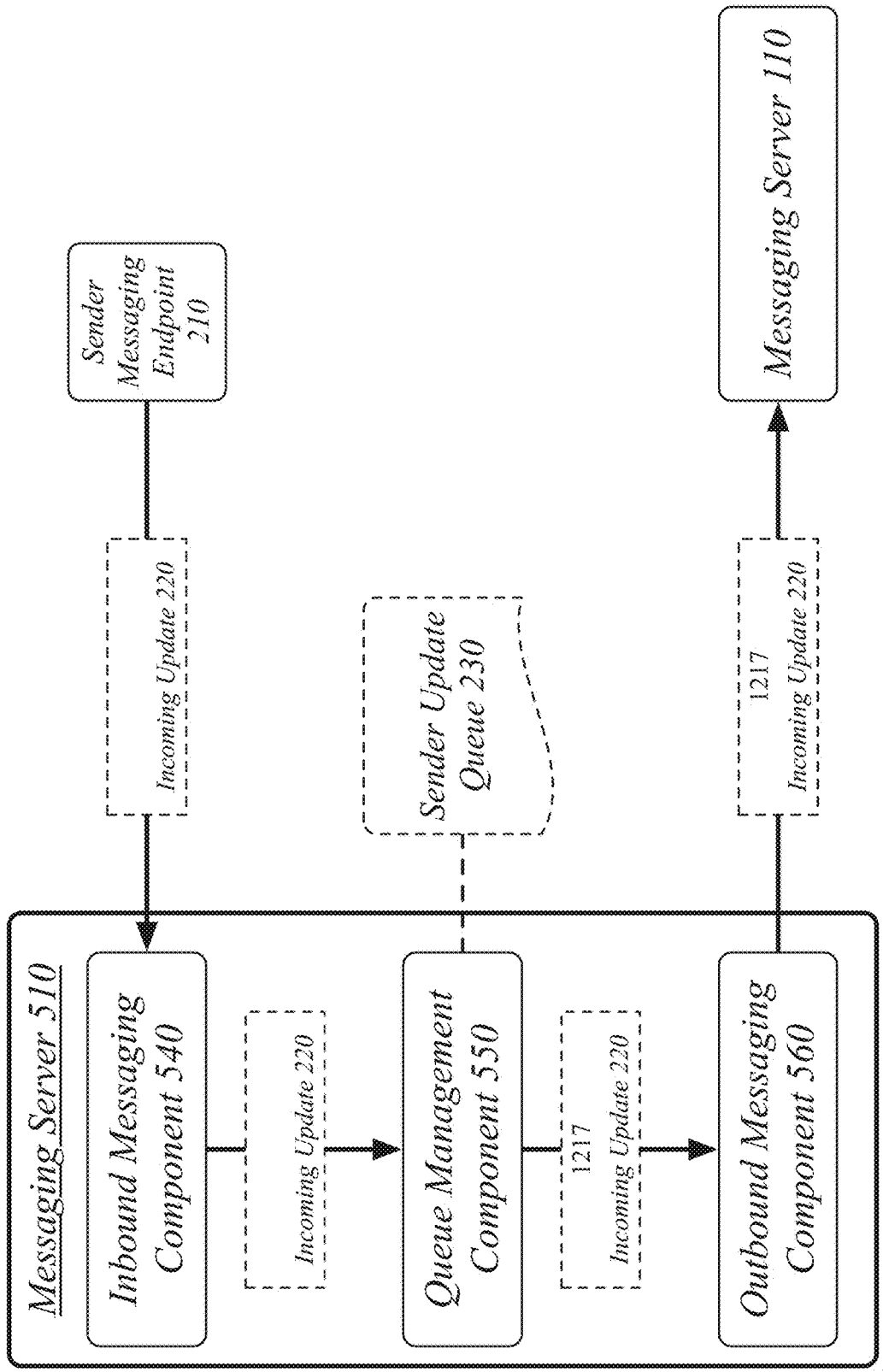
FIG. 6 illustrates an embodiment of a messaging server managing a sender update queue.

FIG. 6 illustrates an embodiment of a messaging server managing a sender update queue.

The incoming update 220 may be received at the recipient update queue 330 from a sender update queue 230 associated with a sender of the incoming update 220. The sender update queue 230 may be maintained by a messaging server 510 substantially similar to the messaging server 110 maintaining the recipient update queue 330. The messaging server 510 may also comprise an inbound messaging component 540, queue management component 550, and outbound messaging component 560.

The inbound messaging component 540 may be operative to receive the incoming update 220 at the sender update queue 230 from a sender messaging endpoint 210. The queue management component 550 may be operative to determine an incoming sender sequence number for the sender update queue 230, the incoming sender sequence number determined by incrementing a highest current sender sequence number for the sender update queue 230, assign the incoming sender sequence number to the incoming update 220, add the incoming update 220 to the sender update queue 230, and queue a worker to forward the incoming update 220 to the recipient update queue 330.

The queue management component 550 may determine a current sender sequence number for a current sender update state of a second sender messaging endpoint associated with the sender of the incoming update 220. The queue management component 550 may determine that the incoming sender sequence number is greater than the current sender sequence number for the current sender update state of the second sender messaging endpoint. The outbound messaging component 560 may transmit the incoming update 220 to the second sender messaging endpoint based on the determination that that the incoming sender sequence number is greater than the current sender sequence number. The queue management component 550 may update the current sender sequence number for the current sender update state of the second sender messaging endpoint to be at least the incoming sender sequence number. As such, the second sender messaging endpoint may be updated with a change made at the first sender messaging endpoint 210.

Update queues such as the sender update queue 230 and recipient update queue 330 may be manipulated in atomic operations performed by workers. Workers may be implemented by worker threads. Workers may lock an update queue prior to modifying the update queue, perform their tasks, and then unlock the update queue after the task is performed. Where multiple workers have tasks to perform on a particular update queue—for example, there are multiple incoming updates—the multiple workers may be queued or otherwise put on hold and allowed to act in sequence.

An update may come into a network socket from messaging endpoint and be placed into an input queue for the update queue. An input processing worker may be kicked, if asleep, to retrieve the update and place it into the update queue, which may be delayed if the input processing worker has to hold to wait for the update queue to be available due to a lock. Placing the update into the update queue may include assigning it the next sequence number for the update queue.

Once the update is placed into the update queue and assigned a sequence number one or more workers may be activated to process the update. An inbox replication group of one or more inbox replication workers may be activated to replicate the update to the inbox across all messaging endpoints associated with the update queue. One inbox replication worker may be activated for each messaging endpoint associated with the update queue. The inbox replication workers may transmit the update to each messaging endpoint as soon as it is available, which may include waiting for a messaging endpoint that is currently offline to come online.

An archival worker may be activated to transmit the update to archival storage for the message inbox associated with the update queue. Archival storage may include a message archive server. A message archive server may be substantially similar to a traditional mail server, and may be referenced where messages older than those stored in the update queue are to be retrieved. Archival storage may include a snapshot component, the snapshot component building an up-to-date snapshot of a current state of a message inbox for quick retrieval by a messaging endpoint that does not maintain state or a new messaging endpoint otherwise being initiated.

A distribution group of one or more distribution workers may be activated to forward the update to any other update queues associated with the update. For instance, if the update is the addition of a new message, the other update queues may be update queues for the recipients of the new message. One distribution worker may be activated for each additional update queue to receive the update. The distribution workers may transmit the update to each additional update queue as soon as it is available, which may include waiting for a messaging server maintaining an update queue that is currently offline—such as for planned or unplanned downtime—to come online.

Update queues may be replicated across multiple servers. For example, an update queue may be replicated in multiple geographic areas to provide faster access to the queue. For example, the messaging system 100 may be primarily based out of a first geographic area, with all of the update queues present in that first geographic area, with a local presence in additional geographic areas. A user in a second geographic area may have a replication of their update queue be present on a server in that second geographic area. In some cases, one of the replications of the update queue may be primary, with all new updates being sent to the update queue to be assigned a sequence number and then forwarded to the other replications of the update queue for faster access as various messaging endpoints associated with the update queue come online.

Sequential Message Reader

Figure 7:
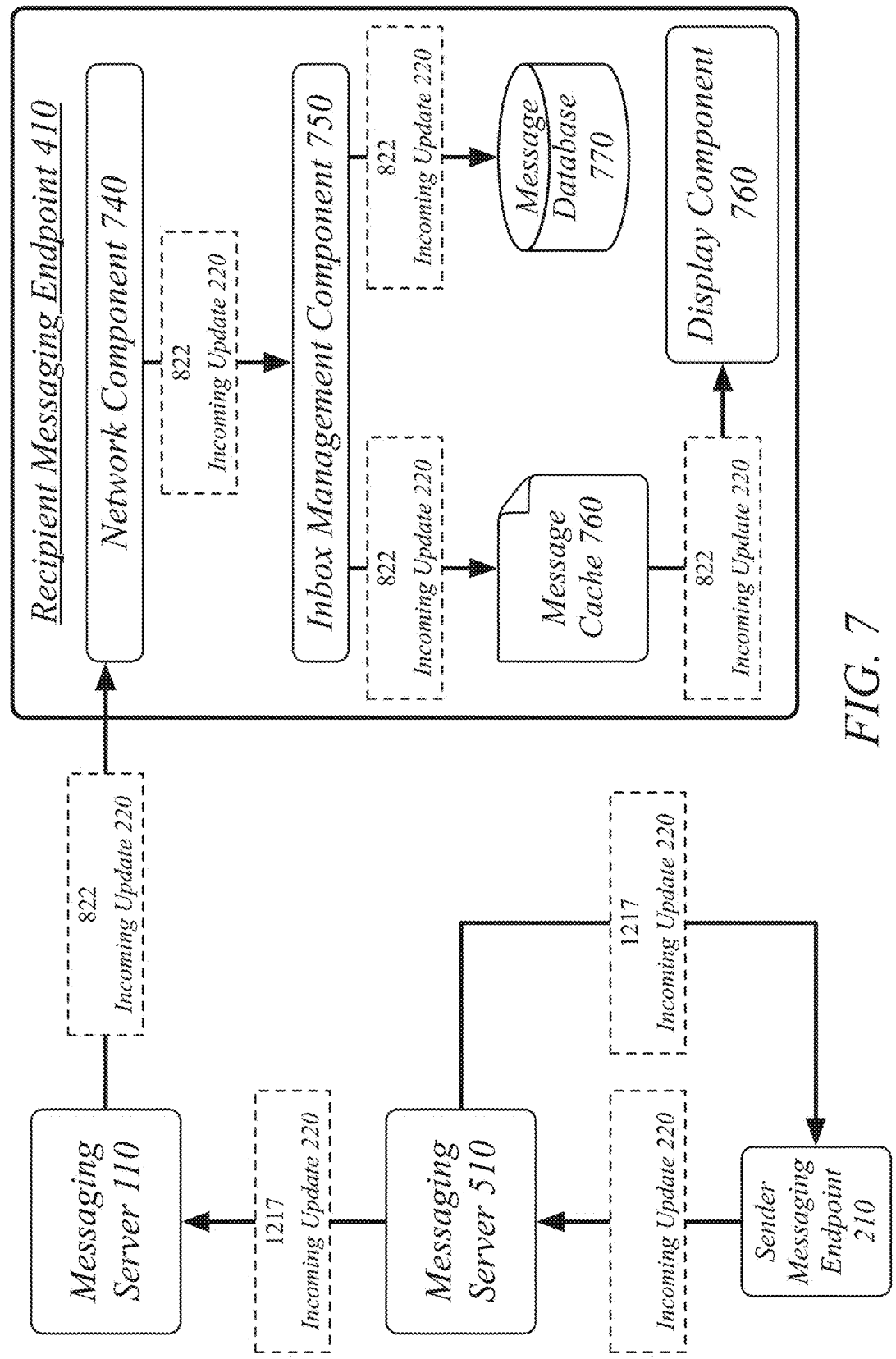
FIG. 7 illustrates an embodiment of messaging endpoints sending and receiving a message.

FIG. 7 illustrates an embodiment of messaging endpoints sending and receiving a message. An incoming update 220 may be produced by a sender messaging endpoint 210, be processed by a messaging server 510 for the sender, a messaging server 110 for the receiver, and then arrive a recipient messaging endpoint 410. The recipient messaging endpoint 410 may comprise a network component 740, inbox management component 750, and display component 760.

The network component 740 may be arranged to receiving an incoming update 220 at the recipient messaging endpoint 410 from a recipient update queue 330 maintained by a messaging server 110 assigned to the recipient messaging endpoint 410. The incoming update 220 may comprise an incoming recipient sequence number.

The inbox management component 750 may be arranged to add the incoming update 220 to a message inbox on the recipient messaging endpoint 410, the incoming update 220 added to the message inbox in an order determined by the incoming recipient sequence number. The inbox management component 750 may determine based on the incoming recipient sequence number whether one or more additional updates are missing from the message inbox on the recipient messaging endpoint 410. The incoming update 220 may comprise an atomic modification to a message inbox for the recipient messaging endpoint 410. The incoming update 220 may be received in response to a determination that a current recipient sequence number associated with the recipient messaging endpoint 410 in the recipient update queue 330 is less than the incoming recipient sequence number.

The inbox management component 750 may determine based on the incoming recipient sequence number that the one or more additional updates are missing from the message inbox on the messaging endpoint. The inbox management component 750 may determine a smallest missing sequence number based on the incoming recipient sequence number. The network component 740 may transmit a missing update request from the recipient messaging endpoint 410 to the recipient update queue 330, the missing update request comprising the smallest missing sequence number. The network component 740 may receive the one or more additional updates from the recipient update queue 330 in response to the missing update request.

Where two or more additional updates are missing two or more missing sequence numbers may be determined based on the incoming recipient sequence number, the two or more missing sequence numbers corresponding to the two or more additional updates. A bulk missing update request may be transmitted from the recipient messaging endpoint 410 to the recipient update queue 330, the bulk missing update request comprising the two or more missing sequence numbers. The two or more additional updates may be received from the recipient update queue 330 in response to the missing update request, the two or more additional updates received in a bulk missing update response in a single network transaction. In some cases, multiple missing updates may cancel each other out, such as where a message is created and then deleted. The messaging server 110 may, rather than transmitting updates that could cancel each other out, replace the updates with no-operation updates that produce the same effect.

The recipient messaging endpoint 410 may comprise a user interface component operative to receive user input for creation of the incoming update 220 and create the incoming update 220. The network component 740 may transmit the incoming update 220 to the recipient update queue 330. This may correspond to a scenario in which the incoming update 220 is produced by the recipient messaging endpoint 410 and then transmitted back to the recipient messaging endpoint 410 in confirmation of the incoming update 220 being applied to the recipient update queue 330. Similarly, where the incoming update 220 is produced by the sender messaging endpoint 210 the messaging server 510 may transmit the incoming update 220 back to the sender messaging endpoint 210.

In some embodiments, the transmission of an update back to the messaging endpoint may be a reduced version of the update excluding information already present on the messaging endpoint. For instance, the messaging endpoint may already include the text of a message produced on the messaging endpoint and not be benefited from receiving a duplicate copy of the text. As such, the text may be excluded from the update transmitted back to the messaging endpoint.

Adding the incoming update 220 to the message inbox may comprise applying the incoming update 220 to a message cache 760 of a messaging application on a device and applying the incoming update 220 to a message database of the messaging application on the device. The message cache may be used by a display component 760 of the messaging application to determine the messages to display on the device and may provide faster access to the message inbox than provided by the message database. The message database of the messaging application may be used to maintain a persistent store of the message inbox for the messaging application.

A messaging endpoint, such as a sender messaging endpoint 210 or a recipient messaging endpoint 410, may experience intermittent network connectivity. For example, a mobile device may lose contact with a cellular station providing cellular data, a mobile device may be put in "airplane mode" and thereby instructed to stop data transmissions, a mobile device may deactivate one or more radio devices in order to conserve power, etc. As such, a messaging endpoint may sometimes transition from experiencing a state of no network connectivity to a state of network connectivity for the device on which it is executed. The messaging endpoint may, in response to determining that a network connection has become available, initiate an update request with its associated update queue.

Hot Snapshots

Figure 8:
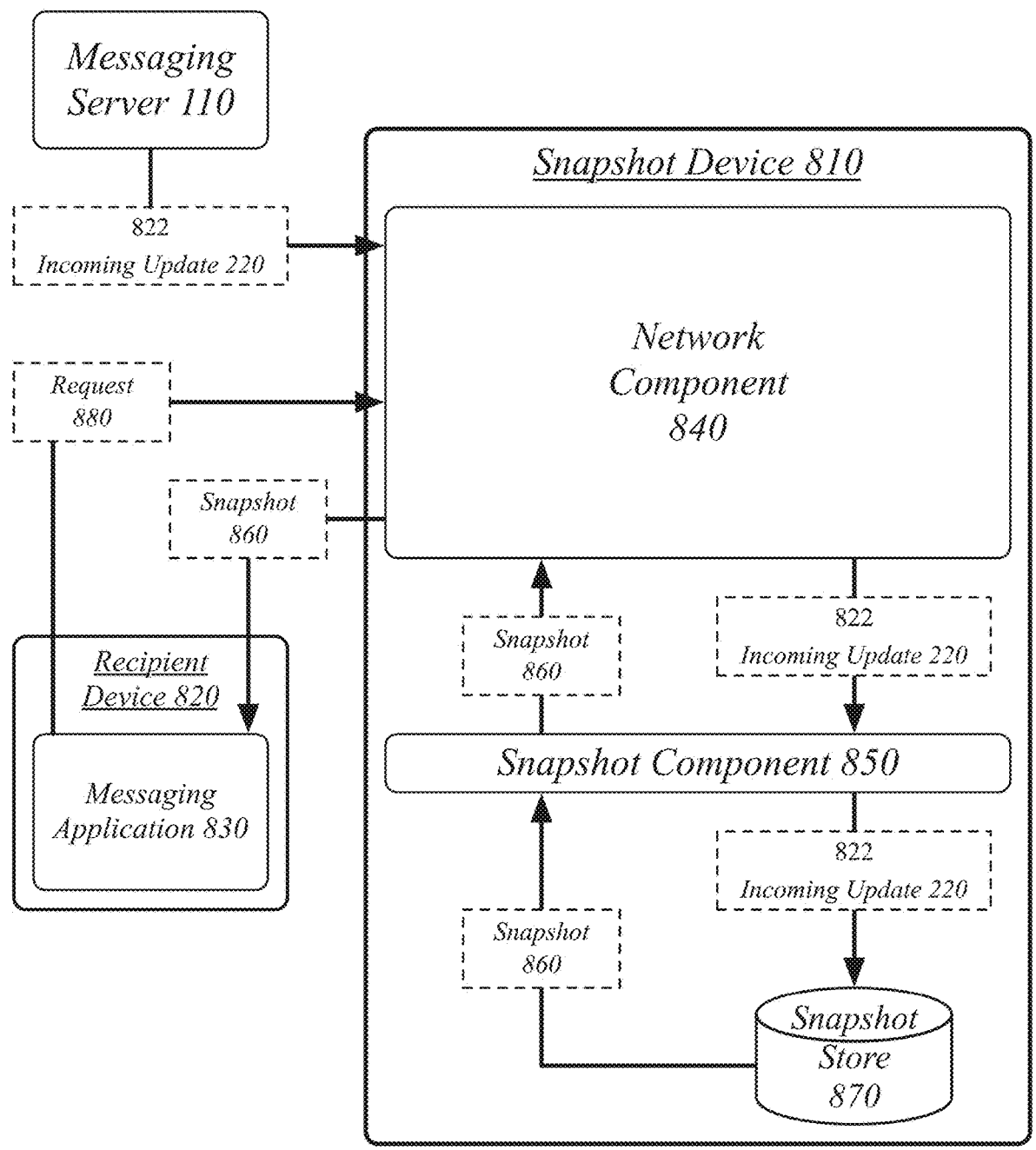
FIG. 8 illustrates an embodiment of a snapshot component.

FIG. 8 illustrates an embodiment of a snapshot device 810 with a snapshot component 850. The snapshot component 850 may comprise a network component 840 and a snapshot component 850. The snapshot component may maintain a current state of a message inbox for rapid retrieval by messaging endpoints for the initial setup of new messaging endpoints and the updating of messaging endpoints whose current state is older than updates that have been removed from an update queue.

The network component 840 may be operative to receiving an incoming update 220. The snapshot component 850 may be operative to retrieve a snapshot 860 for a user associated with the incoming update 220, add the incoming update 220 to the snapshot 860, and remove an oldest update of the snapshot 860 from the snapshot 860. The incoming update 220 may comprise an atomic modification to a message inbox for the recipient messaging endpoint 410. The snapshot 860 may be associated with one of a sender of the incoming update 220 and a recipient of the incoming update 220. The incoming update 220 may be received from a recipient update queue 330 associated with a recipient of the incoming update 220.

The network component 840 may receive a request 880 from a messaging application 830 on a recipient device 820 for the snapshot 860 and transmit the snapshot 860 to the messaging application 830. The network component 840 may receive a messaging application refresh request from a messaging application 830 on a recipient device 820, the messaging application refresh request indicating that the messaging application 830 is further out of date than supported by an update queue for the messaging application 830. The network component 840 may transmit the snapshot 860 to the messaging application 830.

The incoming update 220 may be received from the update queue in response to the update queue determining that the incoming update 220 is associated with an incoming user sequence number higher than a current user sequence number associated with the snapshot component 850 at the update queue. The incoming update 220 may be received in parallel to a transmission of the incoming update 220 to an archival mail server. The transmission of the snapshot 860 from the snapshot component 850 to the messaging application 830 may empower the messaging application 830 to bypass a retrieval of messages from the archival mail server.

The snapshot 860 may be associated with a group discussion thread. The incoming update 220 may be received from a group discussion thread update queue. The network component 840 may receive a group discussion thread join request from a messaging endpoint, the group discussion thread join request indicating that an additional user is joining the group discussion thread. This group discussion thread join request may have been forwarded via a component managing the group discussion thread. In response to the group discussion thread join request, the network component 840 may transmit the snapshot 860 to the messaging application to bring the messaging endpoint up-to-date with the group discussion thread.

The snapshot component 850 may identifying a messaging thread corresponding to the incoming update 220 and apply the incoming update 220 to the messaging thread. The messaging thread may correspond to a conversation carried out by two or more users of the messaging system 100.

Where the messaging thread is between two users, the messaging thread may correspond to a canonical representation of the messaging history for messaging sent between the two users. One of the two users may correspond to a sender of the incoming update 220 and the other to the recipient of the incoming update 220. Applying the incoming update 220 may comprise adding a message to the messaging thread, deleting a message from the messaging thread, modifying a message in the messaging thread, marking one or more messages in the messaging thread as having been read, or any other modification to the messaging thread.

The snapshot component 850 may determine that a number of messaging threads stored in a messaging snapshot 860 is greater than a thread storage limit for the messaging snapshot 860. The thread storage limit for the messaging snapshot 860 may correspond to a default thread storage limit, such as twenty threads. In response to determining that the number of messaging threads is greater than the thread storage limit, the snapshot component 850 may identify a least-recently-updated messaging thread currently stored in the messaging snapshot 860. The snapshot component 850 may then remove the least-recently updated messaging thread from the messaging snapshot 860. Removing the least-recently updated messaging thread may comprise removing all of the messages associated with that least-recently updated messaging thread from the snapshot 860. The least-recently updated messaging thread may comprise the messaging thread of a plurality of messaging threads stored in the snapshot 860 with the least-recent application of an update to that messaging thread.

The thread storage limit for the messaging snapshot 860 for the user may be set higher than a default thread storage limit based on an identification of a high rate of messaging activity by the user. The thread storage limit for the messaging snapshot 860 for the user may be set lower than a default message store limit based on an identification of a low rate of messaging activity by the user. A high or low rate of messaging activity may correspond to a defined number of messages per day, per week, or per other period of time. A high or low rate of messaging activity may correspond to a user being in a particular top percentile (for a high rate) or a particular bottom percentile (for a low rate) of messaging activity per period of time.

In general, threads that are predicted to be more likely to be read may be cached. The preference for caching threads that have been more recently written to may comprise a better prediction than threads which have been more recently read. A user may be more likely to visit or revisit a thread with recent activity (the user sending or receiving messages in that thread) than that has merely been recently read. Merely reading a thread may not comprise updating the thread and may, therefore, not indicate that a thread should be retained in the cache. In some embodiments, additional criteria may be used in the selection of which messaging thread to remove from the snapshot 860. For example, threads that correspond to users with which the user associated with the snapshot 860 has a high friend coefficient may be retained even where they are the least-recently updated thread. A high friend coefficient for a user may correspond to the user having a high degree of interaction with that user in a messaging or social-networking service.

In some cases, an incoming update 220 may be for a messaging thread not currently represented in the snapshot 860. The snapshot component 850 may, therefore, have to retrieve the messaging thread from a message archive on a message archive server. The snapshot component 850 may determine that the messaging thread is not currently stored in the messaging snapshot 860 and retrieve at least a portion of the messaging thread from a message archive in response. The snapshot component 850 may only retrieve a predefined number of the most recent messages in the messaging thread. The snapshot component 850 may store the retrieved portion of the messaging thread in the messaging snapshot 860 and apply the incoming update 220 to the messaging thread.

The message archive may be updated using similar techniques to the updating of the snapshot 860. However, the message archive and the snapshot 860 may not be in sync with each other based on not having received the same updates. One of the archive and the snapshot 860 may be more advanced along a message queue than the other. Where the archive is more advanced than the snapshot 860, one or more updates received by the snapshot component 850 for this snapshot 860 may be ignored as having already been applied to the snapshot 860. Where the snapshot 860 is more advanced than the archive, updates may need to be retrieved and applied to the retrieved portion of the messaging thread in order to bring the messaging thread up to date with the rest of the snapshot 860.

The portion of the messaging thread retrieved from the message archive may be associated with a current archive sequence number indicating the progress of the archive in receiving updates related to this messaging thread. The snapshot component 850 may determine that the current archive sequence number is less than a current snapshot sequence number, the current snapshot sequence number corresponding to an update progress for this snapshot 860. The snapshot component may retrieve one or more additional updates based on a difference between a current archive sequence number and the current snapshot sequence number and update the retrieved portion by applying the one or more updates to the retrieved portion. These updates may be retrieved from the same queue that forwarded the incoming update 220 and should still be available in that queue as they are, apparently, still queued for the archive (due to the archive having not yet applied these updates and therefore being behind in sequence number). The snapshot component 840 may store the updated retrieved portion in the messaging snapshot 860 and apply the incoming update 220 to the messaging thread based on the updated retrieved portion.

Alternatively, the snapshot component 850 may determine that the current archive sequence number is greater than a current snapshot sequence number and store the retrieved portion in the messaging snapshot 860 without updating it, as it is, at least, no less advanced than the snapshot 860. The snapshot component 850 may then receive additional updates, such as through the normal reception of updates from a messaging queue. However, one or more of the additional updates may have already been applied to the snapshot 860 due to the archive being more advanced along the queue. As such, the snapshot component 850 may skip one or more of the additional updates based on the skipped one or more additional updates being associated with sequence numbers less than or equal to the current archive sequence number.

In some embodiments, a snapshot 860 may be stored as a connected unit within a cache. However, in other embodiments, each messaging thread for the snapshot 860 may be stored as its own unit subject to individual retrieval, modification, and deletion. To retrieve a messaging thread, the snapshot component 850 may retrieve an index for the snapshot 860 from a cache, determine a messaging thread to retrieve from the cache using the index, and retrieve the messaging thread based on this index (which may store, for example, retrieval identifiers for each messaging thread cached for the snapshot 860). The snapshot component 850 may then operate on the retrieved thread as described herein. In addition, when retrieving the index, the snapshot component 850 may determine whether other threads referenced in the index are sufficiently old as to be removed from the cache. The snapshot component 850 may determine that one or more threads referenced in the index are older than a predefined threshold and mark the one or more threads for deletion from the cache. By only examining the threads when the snapshot is retrieved, some threads may be allowed to linger longer than the threshold age, but processing time may be saved by avoiding retrieving a snapshot 860 only to evaluate whether one or more threads should be removed.

Intelligent Messaging

Figure 9:
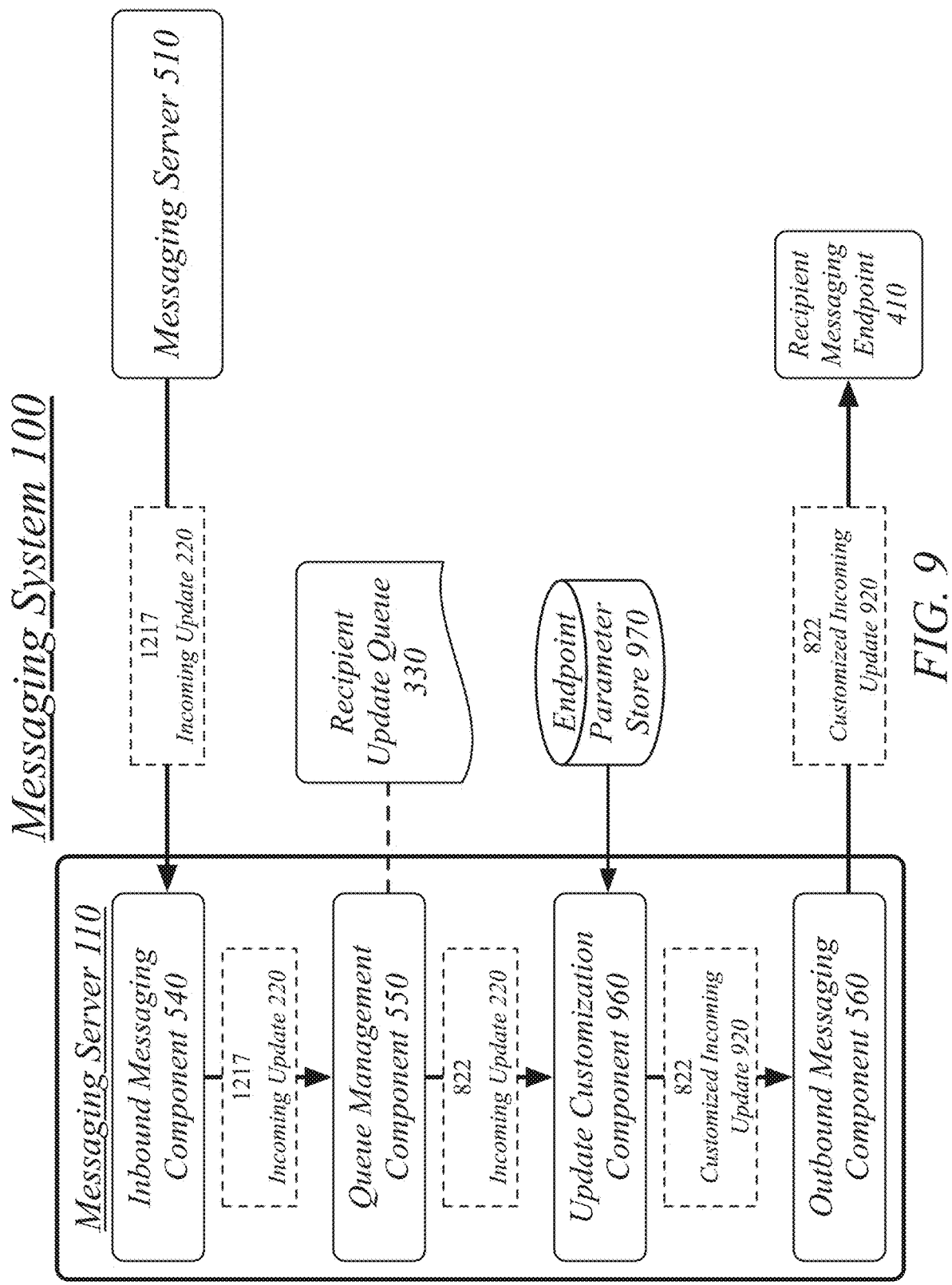
FIG. 9 illustrates an embodiment of a messaging server customizing an update for a messaging endpoint.

FIG. 9 illustrates an embodiment of a messaging server 110 customizing an incoming update 220 for a recipient messaging endpoint 410. The messaging server 110 may comprise an update customization component 960 for customizing the incoming update 220. Customizing the incoming update 220 may be performed based on recipient messaging endpoint parameters stored in a endpoint parameter store 970.

The inbound messaging component 540 may receive an incoming update 220 at a recipient update queue 330, the recipient update queue 330 associated with a recipient of the incoming update 220. The queue management component 550 may add the incoming update to the recipient update queue 330 and determine a recipient messaging endpoint 410 to receive the incoming update 220.

The update customization component 960 may retrieve one or more recipient messaging endpoint parameters associated with the recipient messaging endpoint 410 and generate a customized incoming update 920 from the incoming update 220 according to the one or more recipient messaging endpoint parameters. The outbound messaging component 560 may transmit the customized incoming update 920 to the recipient messaging endpoint 410. Where a plurality of recipient messaging endpoints are to receive the incoming update 220, a plurality of customized incoming updates may be generated with each of the customized incoming updates transmitted to a corresponding recipient messaging endpoint.

The one or more recipient messaging endpoint parameters may indicate a language associated with the recipient messaging endpoint 410. The customized incoming update 920 may comprise an insertion of form text in the language associated with the recipient messaging endpoint 410. The incoming update 220 may comprise a form text in a first language, the one or more recipient messaging endpoint parameters indicating a second language associated with the recipient messaging endpoint 410. The customized incoming update 920 may comprise a replacement of the form text with a translated form text in the second language. Alternatively, the incoming update 220 may comprise a form text identifier, the one or more recipient messaging endpoint parameters indicating a language associated with the recipient messaging endpoint 410. The customized incoming update 920 may comprise an insertion of form text in the language associated with the recipient messaging endpoint 410 in place of the form text identifier.

The incoming update may comprise a media element. The one or more recipient messaging endpoint parameters may indicate a location of the recipient messaging endpoint 410. The customized incoming update 920 may comprise an insertion of a content distribution network uniform resource locator for retrieval of the media element. The update customization component 960 may select the content distribution network uniform resource locator from a plurality of content distribution network uniform resource locators based on the location of the recipient messaging endpoint 410.

The incoming update 220 may comprise a media element. The one or more recipient messaging endpoint parameters may indicate a media quality preference. Media quality preferences may be determined based on device display resolution, device processing power, device battery power, device bandwidth availability, and other device factors. The customized incoming update 920 may comprise an insertion of a retrieval uniform resource locator for retrieval of the media element. The update customization component 960 may select the retrieval uniform resource locator from a plurality of retrieval uniform resource locators based on the media quality preference. The type of network may comprise a cellular network, wherein the retrieval uniform resource locator corresponding to a reduced-bandwidth version of the media element based on the type of network being a cellular network. The media quality preference may indicate a screen resolution of the recipient messaging endpoint 410, the retrieval uniform resource locator selected based on the screen resolution of the recipient messaging endpoint 410.

The update customization component 960 may receive a notification of an opening of a network connection with the recipient messaging endpoint 410. The update customization component 960 may receive a status update from the recipient messaging endpoint 410 across the network connection, the status update including the location of the recipient messaging endpoint 410. The update customization component 960 may update the one or more recipient messaging endpoint parameters to include the location of the recipient messaging endpoint. The status update may include a type of network used for the network connection. The update customization component 960 may update the one or more recipient messaging endpoint parameters to include the type of network used for the network connection.

The update customization component 960 may customize the incoming update 220 to produce the customized incoming update 920 based on what information is useful to a messaging endpoint receiving the customized incoming update 920. Where the messaging endpoint is a mobile device such as a smartphone or tablet, the customized incoming update 920 may include only that information used by a local application on the mobile device when displaying messages. Where the messaging endpoint is an archival mail server, all information available for the incoming update 220 may be included. Where the messaging endpoint is a session with a web browser, the customized incoming update 920 may include only that information used by a web client. Where none of the information in an update would be of use to a messaging endpoint, the update may be transmitted as a no-operation update producing no effect on the messaging endpoint.

The incoming update 220 may be associated with a significant quantity of information upon reception by the messaging server 110. For instance, the messaging system 100 may be associated with a social networking service. The incoming update 220 may be associated with social networking information about a user producing the incoming update 220. This social networking information may be used for data mining or display on some messaging endpoints, such as a web browser accessing the social networking service. This social networking information may be excluded when producing a customized incoming update 920 for applications on mobile devices.

Messaging system 100 may include an authorization server (or other suitable component(s)) that allows users to opt in to or opt out of having their actions logged by messaging system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of messaging applications through blocking, data hashing, anonymization, or other suitable techniques as appropriate.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Logic Flows

FIG. 10A illustrates one embodiment of a logic flow 1000. The logic flow 1000 may be representative of some or all of the operations executed by one or more embodiments described herein.

In the illustrated embodiment shown in FIG. 10A, the logic flow 1000 may receive an incoming update 220 at a recipient update queue 330, the recipient update queue 330 associated with a recipient of the incoming update 220 at block 1002.

The logic flow 1000 may determine an incoming recipient sequence number for the recipient update queue 330, the incoming recipient sequence number determined by incrementing a highest current recipient sequence number for the recipient update queue 330 at block 1004.

The logic flow 1000 may assign the incoming recipient sequence number to the incoming update 220 at block 1006.

The logic flow 1000 may add the incoming update 220 to the recipient update queue at block 1008.

The logic flow 1000 may determine a current recipient sequence number for a current recipient update state of a recipient messaging endpoint 410 associated with the recipient of the incoming update 220 at block 1010.

The logic flow 1000 may determine that the incoming recipient sequence number is greater than the current recipient sequence number for the current recipient update state of the recipient messaging endpoint 410 at block 1012.

The logic flow 1000 may transmit the incoming update 220 to the recipient messaging endpoint 410 based on the determination that the incoming recipient sequence number is greater than the current recipient sequence number at block 1014.

The logic flow 1000 may update the current recipient sequence number for the current recipient update state of the recipient messaging endpoint 410 to be at least the incoming recipient sequence number at block 1016.

FIG. 10B illustrates one embodiment of a logic flow 1020. The logic flow 1020 may be representative of some or all of the operations executed by one or more embodiments described herein.

In the illustrated embodiment shown in FIG. 10B, the logic flow 1020 may receive an incoming update 220 at a messaging endpoint from a recipient update queue 330, the incoming update 220 comprising an incoming recipient sequence number at block 1022.

The logic flow 1020 may add the incoming update 220 to a message inbox on the messaging endpoint, the incoming update 220 added to the message inbox in an order determined by the incoming recipient sequence number at block 1024.

The logic flow 1020 may determine based on the incoming recipient sequence number whether one or more additional updates are missing from the message inbox on the messaging endpoint at block 1026.

FIG. 10C illustrates one embodiment of a logic flow 1040. The logic flow 1040 may be representative of some or all of the operations executed by one or more embodiments described herein.

In the illustrated embodiment shown in FIG. 10C, the logic flow 1040 may receive an incoming update 220 at a snapshot component 850 at block 1042.

The logic flow 1040 may retrieve a messaging snapshot 860 for a user associated with the incoming update 220 at block 1044.

The logic flow 1040 may add the incoming update 220 to the messaging snapshot 860 at block 1046.

The logic flow 1040 may remove an oldest update of the messaging snapshot 860 from the messaging snapshot 860 at block 1048.

FIG. 10D illustrates one embodiment of a logic flow 1060. The logic flow 1060 may be representative of some or all of the operations executed by one or more embodiments described herein.

In the illustrated embodiment shown in FIG. 10D, the logic flow 1060 may receive an incoming update 220 at a recipient update queue 330, the recipient update queue 330 associated with a recipient of the incoming update 220 at block 1062.

The logic flow 1060 may add the incoming update 220 to the recipient update queue 330 at block 1064.

The logic flow 1060 may determine a recipient messaging endpoint 410 to receive the incoming update 220 at block 1066.

The logic flow 1060 may retrieve one or more recipient messaging endpoint parameters associated with the recipient messaging endpoint 410 at block 1068.

The logic flow 1060 may generate a customized incoming update 920 from the incoming update 220 according to the one or more recipient messaging endpoint parameters at block 1070.

The logic flow 1060 may transmit the customized incoming update 920 to the recipient messaging endpoint 410 at block 1072.

The embodiments are not limited to these examples.

System Embodiments

Figure 11:
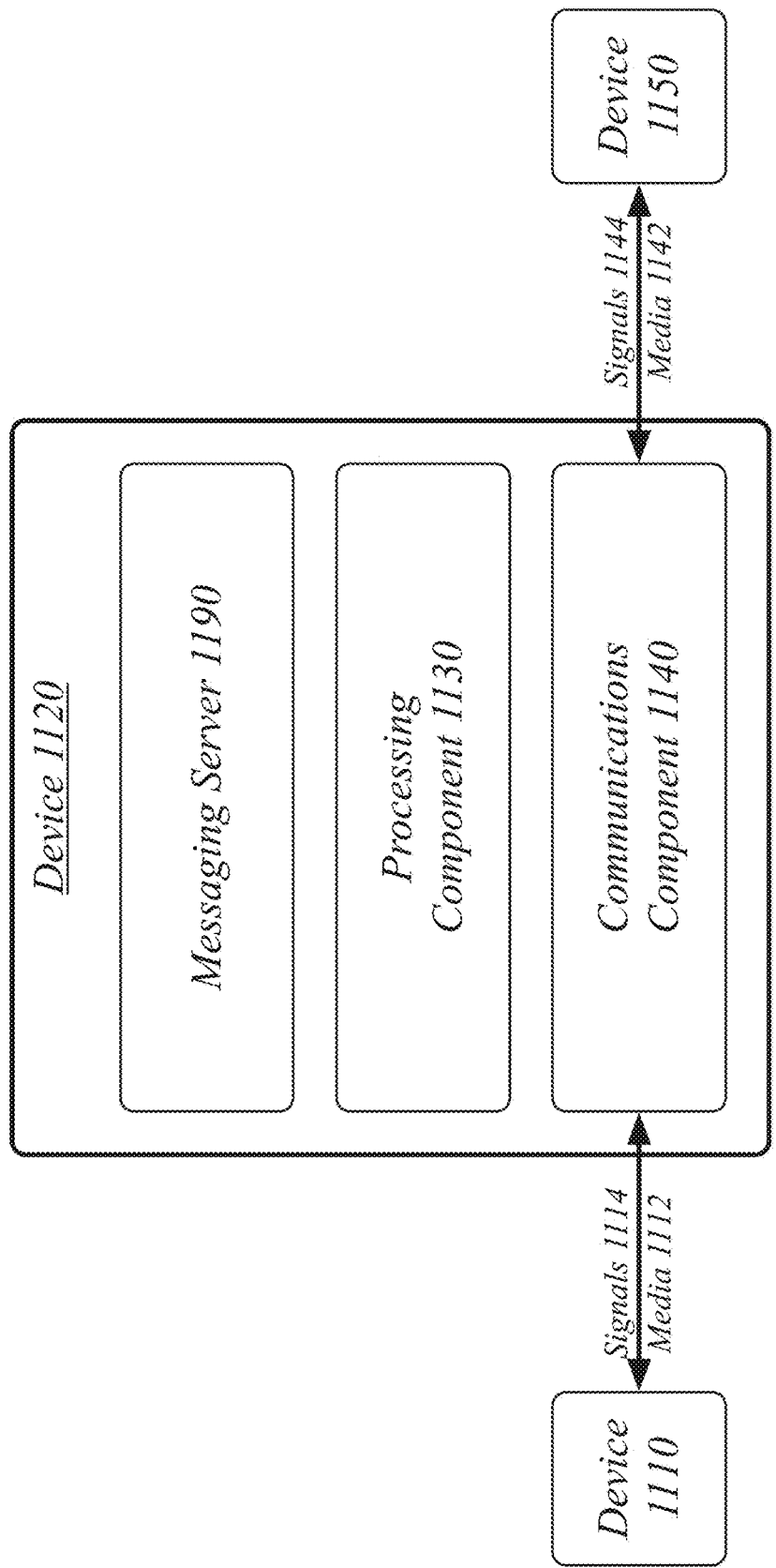
FIG. 11 illustrates an embodiment of a centralized system for the system of FIG. 1.

FIG. 11 illustrates a block diagram of a centralized system 1100. The centralized system 1100 may implement some or all of the structure and/or operations for the messaging system 100 in a single computing entity, such as entirely within a single device 1120.

The device 1120 may comprise any electronic device capable of receiving, processing, and sending information for the messaging system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1120 may execute processing operations or logic for the messaging system 100 using a processing component 1130. The processing component 1130 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1120 may execute communications operations or logic for the messaging system 100 using communications component 1140. The communications component 1140 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1140 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1112, 1142 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1120 may communicate with other devices 1110, 1150 over a communications media 1112, 1142, respectively, using communications signals 1114, 1144, respectively, via the communications component 1140. The devices 1110, 1150 may be internal or external to the device 1120 as desired for a given implementation.

For example, device 1110 may execute a messaging endpoint for a user. The device 1110 may comprise a mobile device executing a local messaging application in communication with the messaging server 1190 executing on the device 1120 for sending and receiving messages. The device 1110 may comprise a device executing a web browser application in communication with the messaging server 1190 executing on the device 1110 for sending and receiving messages. The communication between the device 1110 and device 1120 may comprise the signals 1114 transmitted over media 1112.

Device 1150 may execute a messaging endpoint for a second user. The device 1150 may comprise a mobile device executing a local messaging application in communication with the messaging server 1190 executing on the device 1120 for sending and receiving messages. The device 1150 may comprise a device executing a web browser application in communication with the messaging server 1190 executing on the device 1120 for sending and receiving messages. The communication between the device 1150 and device 1120 may comprise the signals 1144 transmitted over media 1142.

FIG. 11 may represent a scenario in which the device 110 is the messaging server 1190 for both the sender and receiver of a message. The messaging server 1190 will maintain the sender message queue and recipient message queue for the sender and receiver respectively. The messaging server 1190 may receive a message from the sender messaging endpoint, placing the message in the sender queue, forward the message from the sender queue to the recipient queue, then send the message from the recipient queue to the recipient messaging endpoint.

Figure 12:
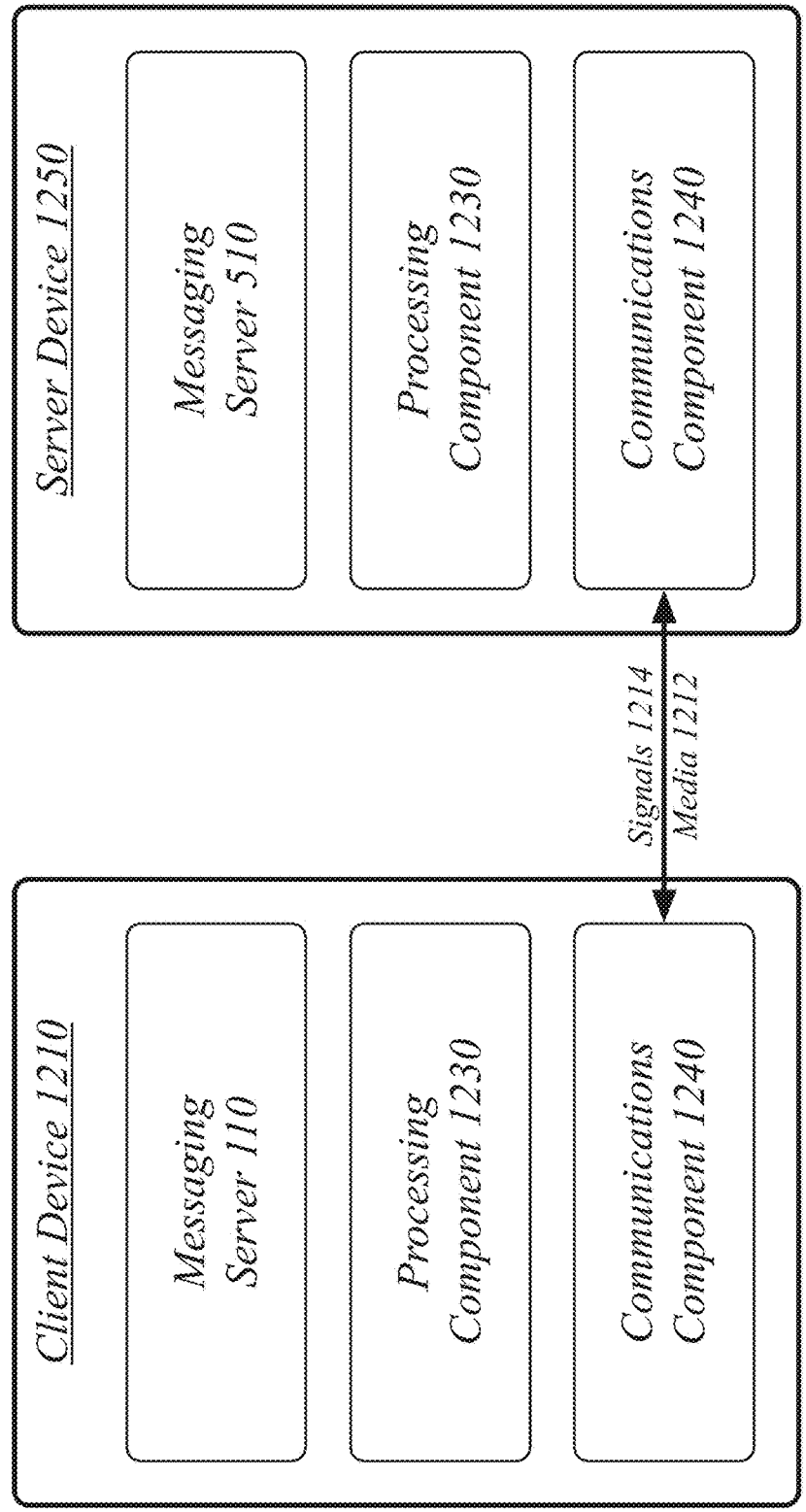
FIG. 12 illustrates an embodiment of a distributed system for the system of FIG. 1.

FIG. 12 illustrates a block diagram of a distributed system 1200. The distributed system 1200 may distribute portions of the structure and/or operations for the messaging system 100 across multiple computing entities. Examples of distributed system 1200 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1200 may comprise a client device 1210 and a server device 1250. In general, the client device 1210 and the server device 1250 may be the same or similar to the client device 820 as described with reference to FIG. 8. For instance, the client system 1210 and the server system 1250 may each comprise a processing component 1230 and a communications component 1240 which are the same or similar to the processing component 830 and the communications component 840, respectively, as described with reference to FIG. 8. In another example, the devices 1210, 1250 may communicate over a communications media 1212 using communications signals 1214 via the communications components 1240.

The client device 1210 may comprise or employ one or more client programs that operate to perform various methodologies in accordance with the described embodiments. In one embodiment, for example, the client device 1210 may implement the messaging server 110.

The server device 1250 may comprise or employ one or more server programs that operate to perform various methodologies in accordance with the described embodiments. In one embodiment, for example, the server device 1250 may implement the messaging server 510.

Signals 1214 sent over media 1212 may comprise the exchange of messages between the messaging server 110 and the messaging server 510. For instance, incoming update 220 may be transmitted from the messaging server 510 to the messaging server 110. In general, a plurality of messages may be transmitted from the messaging server 510 to the messaging server 110 as part of the operation of the messaging system 100. In general, a plurality of messages may be transmitted from the messaging server 110 to the messaging server 510 as part of the operation of the messaging system 100.

Figure 13:
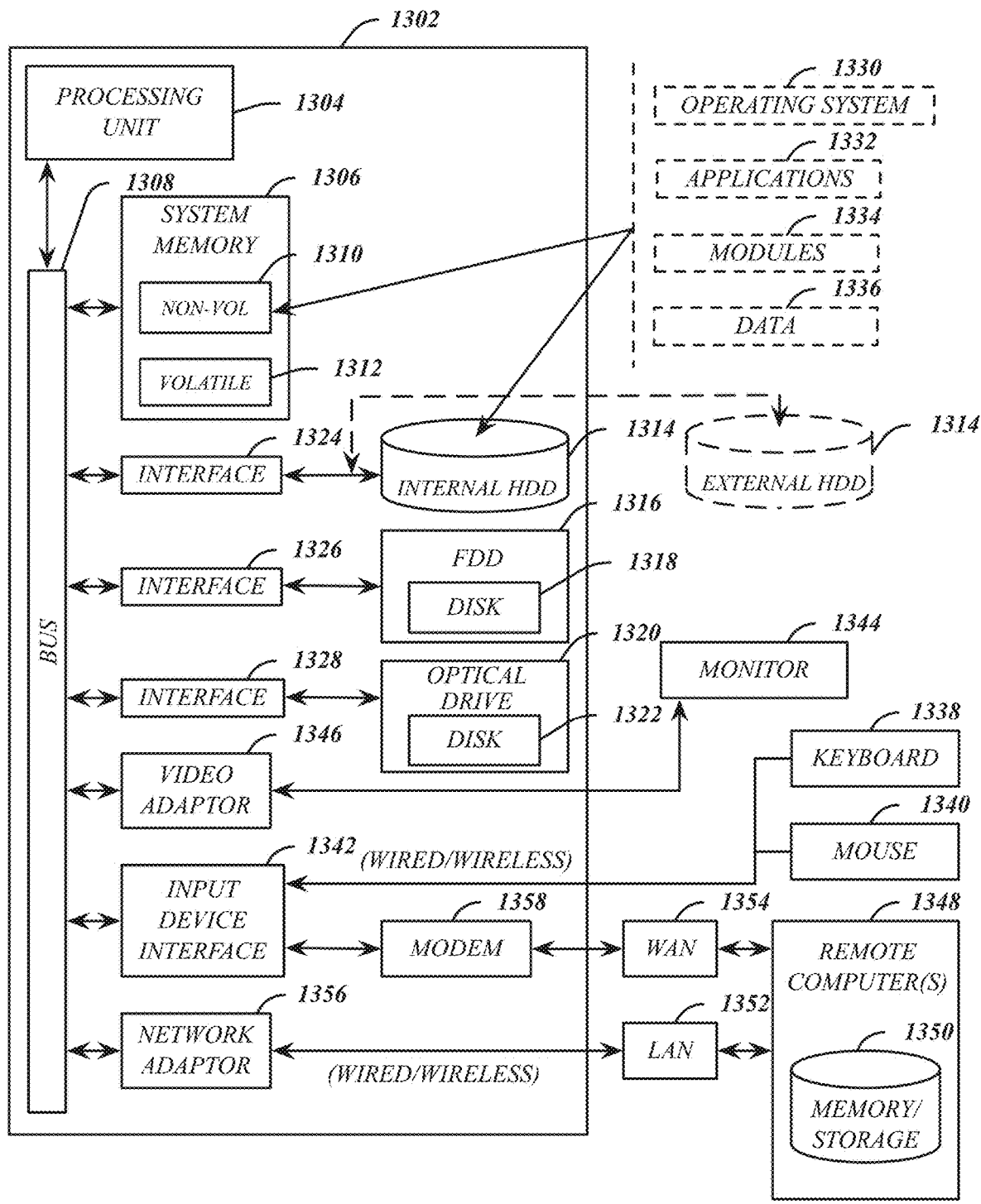
FIG. 13 illustrates an embodiment of a computing architecture.

FIG. 13 illustrates an embodiment of an exemplary computing architecture 1300 suitable for implementing various embodiments as previously described. In one embodiment, the computing architecture 1300 may comprise or be implemented as part of an electronic device. Examples of an electronic device may include those described with reference to FIG. 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1300. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1300 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1300.

As shown in FIG. 13, the computing architecture 1300 comprises a processing unit 1304, a system memory 1306 and a system bus 1308. The processing unit 1304 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1304.

The system bus 1308 provides an interface for system components including, but not limited to, the system memory 1306 to the processing unit 1304. The system bus 1308 can be any of several types of bus structure that may further interconnect to a memory bus (with or without a memory controller), a peripheral bus, and a local bus using any of a variety of commercially available bus architectures. Interface adapters may connect to the system bus 1308 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1300 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1306 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 13, the system memory 1306 can include non-volatile memory 1310 and/or volatile memory 1312. A basic input/output system (BIOS) can be stored in the non-volatile memory 1310.

The computer 1302 may include various types of computer-readable storage media in the form of one or more lower speed memory units, including an internal (or external) hard disk drive (HDD) 1314, a magnetic floppy disk drive (FDD) 1316 to read from or write to a removable magnetic disk 1318, and an optical disk drive 1320 to read from or write to a removable optical disk 1322 (e.g., a CD-ROM or DVD). The HDD 1314, FDD 1316 and optical disk drive 1320 can be connected to the system bus 1308 by a HDD interface 1324, an FDD interface 1326 and an optical drive interface 1328, respectively. The HDD interface 1324 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1310, 1312, including an operating system 1330, one or more application programs 1332, other program modules 1334, and program data 1336. In one embodiment, the one or more application programs 1332, other program modules 1334, and program data 1336 can include, for example, the various applications and/or components of the messaging system 100.

A user can enter commands and information into the computer 1302 through one or more wire/wireless input devices, for example, a keyboard 1338 and a pointing device, such as a mouse 1340. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1304 through an input device interface 1342 that is coupled to the system bus 1308, but can be connected by other interfaces such as a parallel port, IEEE 1394 serial port, a game port, a USB port, an IR interface, and so forth.

A monitor 1344 or other type of display device is also connected to the system bus 1308 via an interface, such as a video adaptor 1346. The monitor 1344 may be internal or external to the computer 1302. In addition to the monitor 1344, a computer typically includes other peripheral output devices, such as speakers, printers, and so forth.

The computer 1302 may operate in a networked environment using logical connections via wire and/or wireless communications to one or more remote computers, such as a remote computer 1348. The remote computer 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wire/wireless connectivity to a local area network (LAN) 1352 and/or larger networks, for example, a wide area network (WAN) 1354. Such LAN and WAN networking environments are commonplace in offices and companies, and facilitate enterprise-wide computer networks, such as intranets, all of which may connect to a global communications network, for example, the Internet.

When used in a LAN networking environment, the computer 1302 is connected to the LAN 1352 through a wire and/or wireless communication network interface or adaptor 1356. The adaptor 1356 can facilitate wire and/or wireless communications to the LAN 1352, which may also include a wireless access point disposed thereon for communicating with the wireless functionality of the adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wire and/or wireless device, connects to the system bus 1308 via the input device interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with wire and wireless devices or entities using the IEEE 802 family of standards, such as wireless devices operatively disposed in wireless communication (e.g., IEEE 802.13 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.13x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 14:
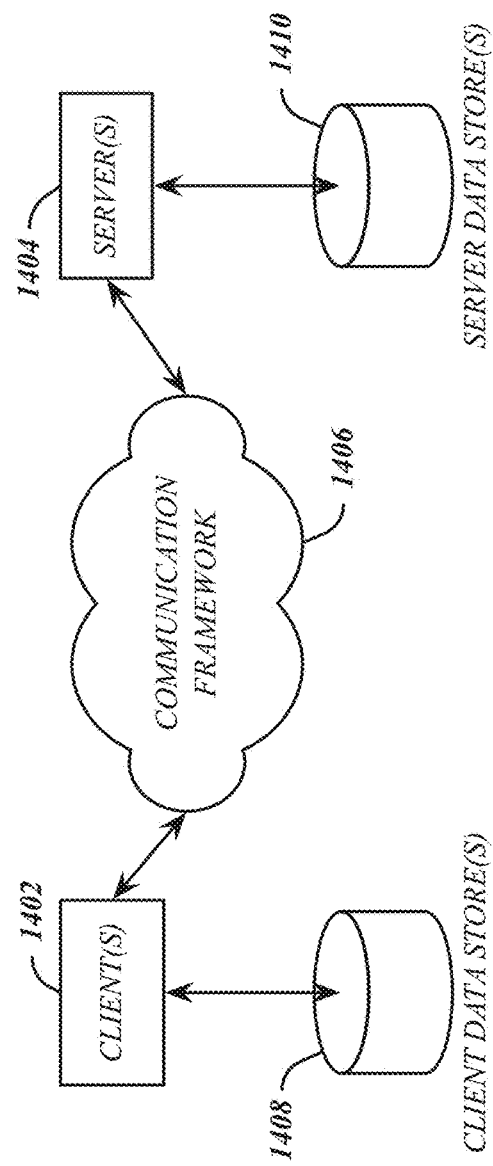
FIG. 14 illustrates an embodiment of a communications architecture.

FIG. 14 illustrates a block diagram of an exemplary communications architecture 1400 suitable for implementing various embodiments as previously described. The communications architecture 1400 includes various common communications elements, such as a transmitter, receiver, transceiver, radio, network interface, baseband processor, antenna, amplifiers, filters, power supplies, and so forth. The embodiments, however, are not limited to implementation by the communications architecture 1400.

As shown in FIG. 14, the communications architecture 1400 comprises includes one or more clients 1402 and servers 1404. The clients 1402 may implement the client device 910. The servers 1404 may implement the server device 950. The clients 1402 and the servers 1404 are operatively connected to one or more respective client data stores 1408 and server data stores 1410 that can be employed to store information local to the respective clients 1402 and servers 1404, such as cookies and/or associated contextual information.

The clients 1402 and the servers 1404 may communicate information between each other using a communication framework 1406. The communications framework 1406 may implement any well-known communications techniques and protocols. The communications framework 1406 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1406 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1402 and the servers 1404. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 15:
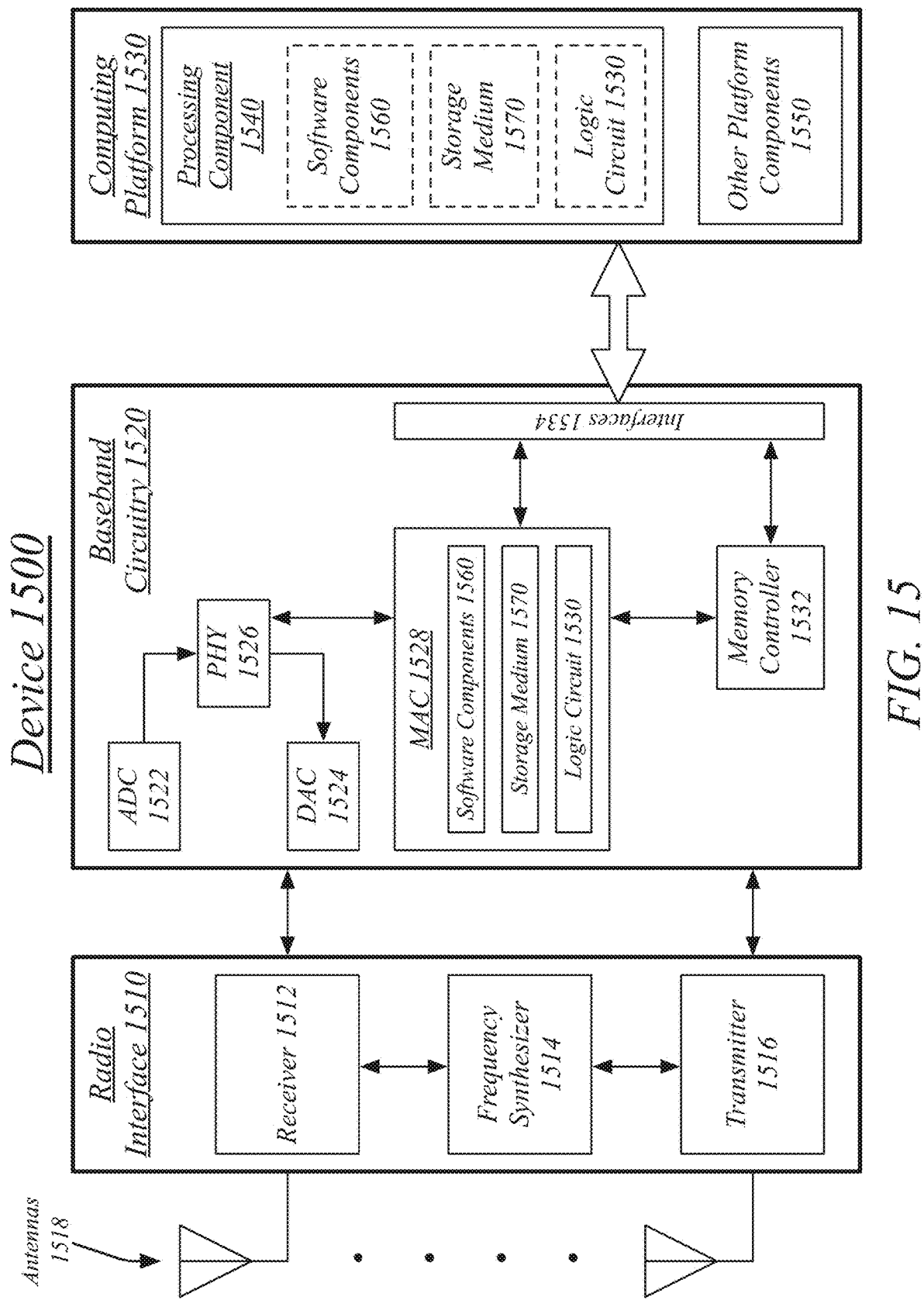
FIG. 15 illustrates an embodiment of a radio device architecture.

FIG. 15 illustrates an embodiment of a device 1500 for use in a multicarrier OFDM system, such as the messaging system 100. Device 1500 may implement, for example, software components 660 as described with reference to messaging system 100 and/or a logic circuit 1530. The logic circuit 1530 may include physical circuits to perform operations described for the messaging system 100. As shown in FIG. 15, device 1500 may include a radio interface 1510, baseband circuitry 1520, and computing platform 1530, although embodiments are not limited to this configuration.

The device 1500 may implement some or all of the structure and/or operations for the messaging system 100 and/or logic circuit 1530 in a single computing entity, such as entirely within a single device. Alternatively, the device 1500 may distribute portions of the structure and/or operations for the messaging system 100 and/or logic circuit 1530 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1510 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme. Radio interface 1510 may include, for example, a receiver 1512, a transmitter 1516 and/or a frequency synthesizer 1514. Radio interface 1510 may include bias controls, a crystal oscillator and/or one or more antennas 1518.

In another embodiment, radio interface 1510 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1520 may communicate with radio interface 1510 to process receive and/or transmit signals and may include, for example, an analog-to-digital converter 1522 for down converting received signals, a digital-to-analog converter 1524 for up converting signals for transmission. Further, baseband circuitry 1520 may include a baseband or physical layer (PHY) processing circuit 1556 for PHY link layer processing of respective receive/transmit signals. Baseband circuitry 1520 may include, for example, a processing circuit 1528 for medium access control (MAC)/data link layer processing. Baseband circuitry 1520 may include a memory controller 1532 for communicating with processing circuit 1528 and/or a computing platform 1530, for example, via one or more interfaces 1534.

In some embodiments, PHY processing circuit 1526 may include a frame construction and/or detection module, in combination with additional circuitry such as a buffer memory, to construct and/or deconstruct communication frames, such as radio frames. Alternatively or in addition, MAC processing circuit 1528 may share processing for certain of these functions or perform these processes independent of PHY processing circuit 1526. In some embodiments, MAC and PHY processing may be integrated into a single circuit.

The computing platform 1530 may provide computing functionality for the device 1500. As shown, the computing platform 1530 may include a processing component 1540. In addition to, or alternatively of, the baseband circuitry 1520, the device 1500 may execute processing operations or logic for the messaging system 100 and logic circuit 1530 using the processing component 1540. The processing component 1540 (and/or PHY 1526 and/or MAC 1528) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1530 may further include other platform components 1550. Other platform components 1550 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1500 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1500 described herein, may be included or omitted in various embodiments of device 1500, as suitably desired. In some embodiments, device 1500 may be configured to be compatible with protocols and frequencies associated one or more of the 3GPP LTE Specifications and/or IEEE 1502.16 Standards for WMANs, and/or other broadband wireless networks, cited herein, although the embodiments are not limited in this respect.

Embodiments of device 1500 may be implemented using single input single output (SISO) architectures. However, certain implementations may include multiple antennas (e.g., antennas 1518) for transmission and/or reception using adaptive antenna techniques for beamforming or spatial division multiple access (SDMA) and/or using MIMO communication techniques.

The components and features of device 1500 may be implemented using any combination of discrete circuitry, application specific integrated circuits (ASICs), logic gates and/or single chip architectures. Further, the features of device 1500 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1500 shown in the block diagram of FIG. 15 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving an incoming update at a recipient update queue, the recipient update queue associated with a recipient of the incoming update; determining an incoming recipient sequence number for the recipient update queue, the incoming recipient sequence number determined by incrementing a highest current recipient sequence number for the recipient update queue; assigning the incoming recipient sequence number to the incoming update; adding the incoming update to the recipient update queue; determining a current recipient sequence number for a current recipient update state of a recipient messaging endpoint associated with the recipient of the incoming update; determining that the incoming recipient sequence number is greater than the current recipient sequence number for the current recipient update state of the recipient messaging endpoint; transmitting the incoming update to the recipient messaging endpoint based on the determination that the incoming recipient sequence number is greater than the current recipient sequence number; and updating the current recipient sequence number for the current recipient update state of the recipient messaging endpoint to be at least the incoming recipient sequence number.

A computer-implemented method may further comprise wherein the incoming update corresponds to an atomic modification to a message inbox for the recipient messaging endpoint.

A computer-implemented method may further comprise wherein the incoming update corresponds to an atomic modification to a message inbox for the recipient messaging endpoint.

A computer-implemented method may further comprise wherein a plurality of current recipient sequence numbers are stored in association with the recipient update queue, wherein determining the current recipient sequence number for the current recipient update state of the recipient messaging endpoint comprises retrieving the current recipient sequence number based on an identifier for the recipient messaging endpoint, further comprising: receiving an update request from the recipient messaging endpoint, the update request comprising the identifier for the recipient messaging endpoint.

A computer-implemented method may further comprise wherein a plurality of current recipient sequence numbers are stored in association with the recipient update queue, each of the plurality of current recipient sequence numbers associated with a different recipient messaging endpoint, further comprising: determining that every current recipient sequence number of the plurality of current recipient sequence numbers is greater than a sequence number for an old update stored in the recipient update queue; and removing the old update from the recipient update queue in response to the determination that every current recipient sequence number of the plurality of current recipient sequence numbers is greater than the sequence number for the old update.

A computer-implemented method may further comprise receiving a notification of an opening of a network connection with the recipient messaging endpoint; and retrieving the current recipient sequence number for the current recipient update state of the recipient messaging endpoint in response to receiving the notification of the opening of the network connection.

A computer-implemented method may further comprise checking, in response to receiving the incoming update at the recipient update queue, whether a network connection is already open with the recipient messaging endpoint; determining that the network connection is already open with the recipient messaging endpoint; and determining the current recipient sequence number for the current recipient update state of the recipient messaging endpoint in response to the determination that the network connection is already open with the recipient messaging endpoint.

A computer-implemented method may further comprise the incoming update received at the recipient update queue from a sender update queue associated with a sender of the incoming update, comprising: receiving the incoming update at the sender update queue from a sender messaging endpoint; determining an incoming sender sequence number for the sender update queue, the incoming sender sequence number determined by incrementing a highest current sender sequence number for the sender update queue; assigning the incoming sender sequence number to the incoming update at the sender update queue; adding the incoming update to the sender update queue; and queuing a worker to forward the incoming update to the recipient update queue.

A computer-implemented method may further comprise determining a current sender sequence number for a current sender update state of a second sender messaging endpoint associated with the sender of the incoming update; determining that the incoming sender sequence number is greater than the current sender sequence number for the current sender update state of the second sender messaging endpoint; transmitting the incoming update to the second sender messaging endpoint based on the determination that that the incoming sender sequence number is greater than the current sender sequence number; and updating the current sender sequence number for the current sender update state of the second sender messaging endpoint to be at least the incoming sender sequence number.

A computer-implemented method may further comprise the incoming update received at the recipient update queue from a group discussion thread update queue, the group discussion thread update queue associated with a group discussion thread, comprising: receiving the incoming update at the group discussion thread update queue from a sender messaging queue; determining an incoming group discussion thread sequence number for the group discussion thread update queue, the incoming group discussion thread sequence number determined by incrementing a highest current group discussion thread sequence number for the group discussion thread update queue; assigning the incoming group discussion thread sequence number to the incoming update at the group discussion thread update queue; adding the incoming update to the group discussion thread update queue; and queuing one or more workers to forward the incoming update to one or more recipient update queues, wherein each of the one or more recipient update queues is associated with a follower of the group discussion thread.

An apparatus may comprise a processor circuit on a device; a recipient inbound messaging component operative on the processor circuit to receive an incoming update at a recipient update queue, the recipient update queue associated with a recipient of the incoming update; a recipient queue management component operative on the processor circuit to determine an incoming recipient sequence number for the recipient update queue, the incoming recipient sequence number determined by incrementing a highest current recipient sequence number for the recipient update queue, assign the incoming recipient sequence number to the incoming update, add the incoming update to the recipient update queue, determine a current recipient sequence number for a current recipient update state of a recipient messaging endpoint associated with the recipient of the incoming update, determine that the incoming recipient sequence number is greater than the current recipient sequence number for the current recipient update state of the recipient messaging endpoint, and update the current recipient sequence number for the current recipient update state of the recipient messaging endpoint to be at least the incoming recipient sequence number; and a recipient outbound messaging component operative on the processor circuit to transmit the incoming update to the recipient messaging endpoint based on the determination that the incoming recipient sequence number is greater than the current recipient sequence number. The apparatus may be operative to implement any of the computer-implemented methods described herein.

At least one computer-readable storage medium may comprise instructions that, when executed, cause a system to perform any of the computer-implemented methods described herein.

A computer-implemented method may comprise receiving an incoming update at a messaging endpoint from a recipient update queue, the incoming update comprising an incoming recipient sequence number; adding the incoming update to a message inbox on the messaging endpoint, the incoming update added to the message inbox in an order determined by the incoming recipient sequence number; and determining based on the incoming recipient sequence number whether one or more additional updates are missing from the message inbox on the messaging endpoint.

A computer-implemented method may further comprise the incoming update comprising an atomic modification to a message inbox for the messaging endpoint.

A computer-implemented method may further comprise wherein the messaging endpoint comprises one of a messaging application on a device and a web browser session.

A computer-implemented method may further comprise wherein the incoming update is received in response to a determination that a current recipient sequence number associated with the messaging endpoint in the recipient update queue is less than the incoming recipient sequence number.

A computer-implemented method may further comprise determining based on the incoming recipient sequence number that the one or more additional updates are missing from the message inbox on the messaging endpoint; determining a smallest missing sequence number based on the incoming recipient sequence number; transmitting a missing update request from the messaging endpoint to the recipient update queue, the missing update request comprising the smallest missing sequence number; and receiving the one or more additional updates from the recipient update queue in response to the missing update request.

A computer-implemented method may further comprise determining based on the incoming recipient sequence number that the two or more additional updates are missing from the message inbox on the messaging endpoint; determining two or more missing sequence numbers based on the incoming recipient sequence number, the two or more missing sequence numbers corresponding to the two or more additional updates; transmitting a bulk missing update request from the messaging endpoint to the recipient update queue, the bulk missing update request comprising the two or more missing sequence numbers; and receiving the two or more additional updates from the recipient update queue in response to the missing update request, the two or more additional updates received in a bulk missing update response in a single network transaction.

A computer-implemented method may further comprise receiving user input for creation of the incoming update; creating the incoming update; and transmitting the incoming update to the recipient update queue.

A computer-implemented method may further comprise wherein adding the incoming update to the message inbox comprises: applying the incoming update to a message cache of a messaging application on a device; and adding the incoming update to a message database of the messaging application on the device.

An apparatus may comprise a processor circuit on a device; a network component operative on the processor circuit to receiving an incoming update at a messaging endpoint from a recipient update queue, the incoming update comprising an incoming recipient sequence number; and an inbox management component operative on the processor circuit to add the incoming update to a message inbox on the messaging endpoint, the incoming update added to the message inbox in an order determined by the incoming recipient sequence number and determine based on the incoming recipient sequence number whether one or more additional updates are missing from the message inbox on the messaging endpoint. The apparatus may be operative to implement any of the computer-implemented methods described herein.

A computer-implemented method may comprise receiving an incoming update at a snapshot component; retrieving a messaging snapshot for a user associated with the incoming update; identifying a messaging thread corresponding to the incoming update; applying the incoming update to the messaging thread; determining that a number of messaging threads stored in the messaging snapshot is greater than a thread storage limit for the messaging snapshot; identifying a least-recently-updated messaging thread currently stored in the messaging snapshot; and removing the least-recently updated messaging thread from the messaging snapshot.

A computer-implemented method may further comprise he incoming update received from a user update queue associated with the user, wherein the incoming update is received from the update queue in response to the update queue determining that the incoming update is associated with an incoming user sequence number higher than a current user sequence number associated with the snapshot component at the update queue.

A computer-implemented method may further comprise receiving a messaging application request from a messaging application on a device, the messaging application request indicating at least one of that the messaging application is performing an initial setup and that the messaging application is further out of date than supported by an update queue for the messaging application; and transmitting the messaging snapshot to the messaging application.

A computer-implemented method may further comprise the messaging snapshot associated with a discussion thread, the incoming update received from a discussion thread update queue, further comprising: receiving a discussion thread join request from a messaging endpoint, the discussion thread join request indicating that an additional user is joining the discussion thread; and transmitting the messaging snapshot to the messaging application.

A computer-implemented method may further comprise the thread storage limit for the messaging snapshot for the user set higher than a default thread storage limit based on an identification of a high rate of messaging activity by the user or the thread storage limit for the messaging snapshot for the user set lower than a default message store limit based on an identification of a low rate of messaging activity by the user.

A computer-implemented method may further comprise determining that the messaging thread is not currently stored in the messaging snapshot; retrieving at least a portion of the messaging thread from a message archive; storing the retrieved portion of the messaging thread in the messaging snapshot; and applying the incoming update to the messaging thread.

A computer-implemented method may further comprise determining that the messaging thread is not currently stored in the messaging snapshot; retrieving at least a portion of the messaging thread from a message archive, the retrieved portion associated with a current archive sequence number; determining that the current archive sequence number is less than a current snapshot sequence number; retrieving one or more additional updates based on a difference between a current archive sequence number and the current snapshot sequence number; updating the retrieved portion by applying the one or more updates to the retrieved portion; storing the updated retrieved portion in the messaging snapshot; and applying the incoming update to the messaging thread based on the updated retrieved portion.

A computer-implemented method may further comprise determining that the messaging thread is not currently stored in the messaging snapshot; retrieving at least a portion of the messaging thread from a message archive, the retrieved portion associated with a current archive sequence number; determining that the current archive sequence number is greater than a current snapshot sequence number; storing the retrieved portion in the messaging snapshot; receiving additional updates; and skipping one or more of the additional updates based on the skipped one or more additional updates being associated with sequence numbers less than or equal to the current archive sequence number.

An apparatus may comprise a processor circuit on a device; a network component operative on the processor circuit to receive an incoming update; and a snapshot component operative on the processor circuit to retrieve a messaging snapshot for a user associated with the incoming update; identify a messaging thread corresponding to the incoming update; apply the incoming update to the messaging thread; determining that a number of messaging threads stored in the messaging snapshot is greater than a thread storage limit for the messaging snapshot; identify a least-recently-updated messaging thread currently stored in the messaging snapshot; and remove the least-recently updated messaging thread from the messaging snapshot. The apparatus may be operative to implement any of the computer-implemented methods described herein.

A computer-implemented method may comprise receiving an incoming update at a recipient update queue, the recipient update queue associated with a recipient of the incoming update; adding the incoming update to the recipient update queue; determining a recipient messaging endpoint to receive the incoming update; retrieving one or more recipient messaging endpoint parameters associated with the recipient messaging endpoint; generating a customized incoming update from the incoming update according to the one or more recipient messaging endpoint parameters; and transmitting the customized incoming update to the recipient messaging endpoint.

A computer-implemented method may further comprise the incoming update comprising a form text in a first language, the one or more recipient messaging endpoint parameters indicating a second language associated with the recipient messaging endpoint, wherein the customized incoming update comprises a replacement of the form text with a translated form text in the second language.

A computer-implemented method may further comprise the incoming update comprising a form text identifier, the one or more recipient messaging endpoint parameters indicating a language associated with the recipient messaging endpoint, wherein the customized incoming update comprises an insertion of form text in the language associated with the recipient messaging endpoint in place of the form text identifier.

A computer-implemented method may further comprise the incoming update comprising a media element, the one or more recipient messaging endpoint parameters indicating a location of the recipient messaging endpoint, wherein the customized incoming update comprises an insertion of a content distribution network uniform resource locator for retrieval of the media element, further comprising: selecting the content distribution network uniform resource locator from a plurality of content distribution network uniform resource locators based on the location of the recipient messaging endpoint.

A computer-implemented method may further comprise receiving a notification of an opening of a network connection with the recipient messaging endpoint; receiving a status update from the recipient messaging endpoint across the network connection, the status update including the location of the recipient messaging endpoint; and updating the one or more recipient messaging endpoint parameters to include the location of the recipient messaging endpoint.

A computer-implemented method may further comprise the incoming update comprising a media element, the one or more recipient messaging endpoint parameters indicating a media quality preference, wherein the customized incoming update comprises an insertion of a retrieval uniform resource locator for retrieval of the media element, further comprising: selecting the retrieval uniform resource locator from a plurality of retrieval uniform resource locators based on the media quality preference.

A computer-implemented method may further comprise receiving a notification of an opening of a network connection with the recipient messaging endpoint; receiving a status update from the recipient messaging endpoint across the network connection, the status update including a type of network used for the network connection; and updating the one or more recipient messaging endpoint parameters to include the type of network used for the network connection.

A computer-implemented method may further comprise the type of network comprising a cellular network, wherein the retrieval uniform resource locator corresponding to a reduced-bandwidth version of the media element.

A computer-implemented method may further comprise the media quality preference indicating a screen resolution of the recipient messaging endpoint, the retrieval uniform resource locator selected based on the screen resolution of the recipient messaging endpoint.

An apparatus may comprise a processor circuit on a device; a recipient inbound messaging component operative on the processor circuit to receive an incoming update at a recipient update queue, the recipient update queue associated with a recipient of the incoming update; a recipient queue management component operative on the processor circuit to add the incoming update to the recipient update queue and determine a recipient messaging endpoint to receive the incoming update; a recipient update customization component operative on the processor circuit to retrieve one or more recipient messaging endpoint parameters associated with the recipient messaging endpoint and generate a customized incoming update from the incoming update according to the one or more recipient messaging endpoint parameters; and a recipient outbound messaging component operative on the processor circuit to transmit the customized incoming update to the recipient messaging endpoint. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
   receiving an incoming update at a recipient update queue at a messaging server, the recipient update queue associated with a recipient of the incoming update, the incoming update corresponding to an atomic modification to a message inbox;
   adding the incoming update to the recipient update queue;
   determining one or more recipient messaging endpoints to receive the incoming update;
   retrieving messaging endpoint parameters associated with each of the one or more recipient messaging endpoints;
   modifying, at the messaging server, the incoming update for each of the one or more recipient messaging endpoints in accordance with the recipient messaging endpoint parameters associated with each of the one or more messaging endpoints to generate a customized incoming update for each of the one or more messaging endpoints; and
   transmitting each of the customized incoming updates to the recipient messaging endpoint for which it has been customized.

2. The method of claim 1, the incoming update comprising a form text in a first language, the one or more recipient messaging endpoint parameters indicating a second language associated with the one or more recipient messaging endpoints, wherein the customized incoming update comprises a replacement of the form text with a translated form text in the second language.

3. The method of claim 1, the incoming update comprising a form text identifier, the one or more recipient messaging endpoint parameters indicating a language associated with the one or more recipient messaging endpoints, wherein the customized incoming update comprises an insertion of form text in the language associated with the one or more recipient messaging endpoints in place of the form text identifier.

4. The method of claim 1, the incoming update comprising a media element, the one or more recipient messaging endpoint parameters indicating a location of the one or more recipient messaging endpoints, wherein the customized incoming update comprises an insertion of a content distribution network uniform resource locator for retrieval of the media element, further comprising:
   selecting the content distribution network uniform resource locator from a plurality of content distribution network uniform resource locators based on the locations of the one or more recipient messaging endpoints.

5. The method of claim 4, comprising:
   receiving a notification of an opening of a network connection with one of the one or more recipient messaging endpoints;
   receiving a status update from the one recipient messaging endpoint across the network connection, the status update including the location of the one recipient messaging endpoint; and
   updating the one or more recipient messaging endpoint parameters associated with the one recipient messaging endpoint to include the location of the one recipient messaging endpoint.

6. The method of claim 1, the incoming update comprising a media element, the one or more recipient messaging endpoint parameters indicating a media quality preference, wherein the customized incoming update comprises an insertion of a retrieval uniform resource locator for retrieval of the media element, further comprising:
   selecting the retrieval uniform resource locator from a plurality of retrieval uniform resource locators based on the media quality preference.

7. The method of claim 6, comprising:
   receiving a notification of an opening of a network connection with one of the one or more recipient endpoint endpoints;
   receiving a status update from the one recipient messaging endpoint across the network connection, the status update including a type of network used for the network connection; and
   updating the one or more recipient messaging endpoint parameters to include the type of network used for the network connection.

8. The method of claim 7, the type of network comprising a cellular network, wherein the retrieval uniform resource locator corresponding to a reduced-bandwidth version of the media element.

9. The method of claim 6, the media quality preference indicating a screen resolution of the one recipient messaging endpoint, the retrieval uniform resource locator selected based on the screen resolution of the one recipient messaging endpoint.

10. An apparatus, comprising:
    a processor circuit on a device;

a recipient inbound messaging component operative on the processor circuit to receive an incoming update at a recipient update queue, the recipient update queue associated with a recipient of the incoming update, the incoming update corresponding to an atomic modification to a message inbox;

a recipient queue management component operative on the processor circuit to add the incoming update to the recipient update queue and determine one or more recipient messaging endpoints to receive the incoming update;

a recipient update customization component operative on the processor circuit to retrieve messaging endpoint parameters associated with each of the one or more recipient messaging endpoints and modify, at the messaging server, the incoming update for each of the one or more met recipient messaging endpoints in accordance with the recipient messaging endpoint parameters associated with each of the one or more messaging endpoints to generate a customized incoming update for each of the one or more messaging endpoints; and a recipient outbound messaging component operative on the processor circuit to transmit each of the customized incoming updates to the recipient messaging endpoint for which it has been customized.

11. The apparatus of claim 10, the one or more recipient messaging endpoint parameters indicating a language associated with the one or more recipient messaging endpoints, wherein the customized incoming update comprises an insertion of form text in the language associated with the one or more recipient messaging endpoints.

12. The apparatus of claim 10, the incoming update comprising a media element, the one or more recipient messaging endpoint parameters indicating a location of the one or more recipient messaging endpoints, wherein the customized incoming update comprises an insertion of a content distribution network uniform resource locator for retrieval of the media element, the recipient update customization component operative to select the content distribution network uniform resource locator from a plurality of content distribution network uniform resource locators based on the locations of the one or more recipient messaging endpoints.

13. The apparatus of claim 10, the recipient update customization component operative to receive a notification of an opening of a network connection with one of the one or more recipient messaging endpoints, receive a status update from the one recipient messaging endpoint across the network connection, the status update including the location of the one recipient messaging endpoint, and update the one or more recipient messaging endpoint parameters associated with the one recipient messaging endpoint to include the location of the one recipient messaging endpoint.

14. The apparatus of claim 10, the incoming update comprising a media element, the one or more recipient messaging endpoint parameters indicating a media quality preference, wherein the customized incoming update comprises an insertion of a retrieval uniform resource locator for retrieval of the media element, the recipient update customization component operative to select the retrieval uniform resource locator from a plurality of retrieval uniform resource locators based on the media quality preference.

15. The apparatus of claim 10, the recipient update customization component operative to receive a notification of an opening of a network connection with one of the one or more recipient messaging endpoints, receive a status update from the one recipient messaging endpoint across the network connection, the status update including a type of network used for the network connection, and update the one or more recipient messaging endpoint parameters to include the of network used for the network connection.

16. At least one non-transitory computer-readable storage medium comprising instructions that, when executed, cause a system to:

receive an incoming update at a recipient update queue, the recipient update queue associated with a recipient of the incoming update, the incoming update corresponding to an atomic modification to a message inbox;

add the incoming update to the recipient update queue;

determine one or more recipient messaging endpoints to receive the incoming update;

retrieve recipient messaging endpoint parameters associated with each of the one or more recipient messaging endpoints;

modify, at the messaging server, the incoming update for each of the one or more recipient messaging endpoints in accordance with the recipient messaging endpoint parameters associated with each of the one or more messaging endpoints to generate a customized incoming update for each of the one or more messaging endpoints; and transmit each of the customized incoming updates to the recipient messaging endpoint for which it has been customized.

17. The computer-readable storage medium of claim 16, the one or more recipient messaging endpoint parameters indicating a language associated with the one or more recipient messaging endpoints, wherein the customized incoming update comprises an insertion of form text in the language associated with the one or more recipient messaging endpoints.

18. The computer-readable storage medium of claim 16, the incoming update comprising a media element, the one or more recipient messaging endpoint parameters indicating a location of the one or more recipient messaging endpoints, wherein the customized incoming update comprises an insertion of a content distribution network uniform resource locator for retrieval of the media element, comprising further instructions that, when executed, cause a system to:

select the content distribution network uniform resource locator from a plurality of content distribution network uniform resource locators based on the locations of the one or more recipient messaging endpoints.

19. The computer-readable storage medium of claim 16, comprising further instructions that, when executed, cause a system to:

receive a notification of an opening of a network connection with one of the one or more recipient messaging endpoints;

receive a status update from the one recipient messaging endpoint across the network connection, the status update including the location of the one recipient messaging endpoint; and update the one or more recipient messaging endpoint parameters associated with the one recipient messaging endpoint to include the location of the one recipient messaging endpoint.

20. The computer-readable storage medium of claim 16, comprising further instructions that, when executed, cause a system to:

receive a notification of an opening of a network connection with one of the one or more recipient messaging endpoints;

receive a status update from the one recipient messaging endpoint across the network connection, the status update including a type of network used for the network connection; and update the one or more recipient messaging endpoint parameters to include the of type of network used for the network connection.

\* \* \* \* \*